United States Patent
Killeen, Jr. et al.

(10) Patent No.: US 6,324,523 B1
(45) Date of Patent: Nov. 27, 2001

(54) INTEGRATED CLIENT RELATIONSHIP MANAGEMENT PROCESSOR

(75) Inventors: John J. Killeen, Jr., Robinsville; Gilbert H. Stamler, Scotch Plains; Cynthia K. Banford, Highland Park; Patrick M. Carney, West Trenton; Donna G. Batavia, Hoboken; Hollie A. Gill-Fagan, Cranberry; James G. Bennett, Lebanon, all of NJ (US)

(73) Assignee: Merrill Lynch & Co., Inc., New York, NY (US)

( * ) Notice: Subject to any disclaimer, the term of this patent is extended or adjusted under 35 U.S.C. 154(b) by 0 days.

(21) Appl. No.: 08/940,244

(22) Filed: Sep. 30, 1997

(51) Int. Cl.[7] .................................................. G06F 17/60
(52) U.S. Cl. ............................... 705/35; 705/36; 705/37; 705/39
(58) Field of Search ................................. 705/30, 37, 38, 705/35, 36, 39

(56) References Cited

U.S. PATENT DOCUMENTS

| 5,126,936 | 6/1992 | Champion et al. | 705/38 |
| 5,193,056 | 3/1993 | Boes | 705/36 |
| 5,704,045 | 12/1997 | King et al. | 705/37 |
| 5,832,461 | 11/1998 | Leon et al. | 705/38 |

FOREIGN PATENT DOCUMENTS

| 99203634 | * | 5/2000 | (EP) | G06F/1/00 |
| WO 013432 | * | 5/2001 | (WO) | G06F/13/00 |
| WO 0116808 | * | 3/2001 | (WO) | G06F/17/30 |

OTHER PUBLICATIONS

Shup, Asset Management, Part 2, from Interactivity, p36, Jul. 1997.*
Berris, Five "end-of-century" trands in domestic private banking Trust & Estates, v135n13 pp:10–18, Dec. 1996.*

* cited by examiner

Primary Examiner—Nga B. Nguyen
Assistant Examiner—Cuong H. Nguyen
(74) Attorney, Agent, or Firm—Hopgood, Calimafde, Judlowe & Mondolino, LLP

(57) ABSTRACT

A data processing system initiates, implements, confirms and updates a novel financial transaction support service, which provides an allotment of brokerage transactions, related financial services, and banking account services at a fee predicated on total assets in a selectively constructed Account Group.

The foregoing system permits wide scale implementation of an asset-based fee structure for a wide range of services, with simplified and enhanced tracking of account activity.

6 Claims, 22 Drawing Sheets

INTEGRATED CLIENT RELATIONSHIP MANAGEMENT PROCESSOR

FIELD OF THE INVENTION

The present invention generally relates to data processing systems and methods used to manage a unique asset-based financial resource processor. In particular, the present invention relates to the systems, database structures, and controlling data processing logic for coordinating a plurality of accounts directed to financial instruments and investments to enhance client resource access and utilization.

BACKGROUND OF THE INVENTION

Financial planning for individuals inherently involves the selection and purchase of various financial assets forming a collection of core investments with the hope that they appreciate in value. Most individuals, however, are ill-equipped to research the various investment opportunities so that they can pick and choose appropriate investment vehicles that provide the requisite balance of risk/reward to address their current needs.

Accordingly, the brokerage industry in this country has customarily provided guidance to investors regarding the appropriateness of select financial investments. By working with their brokers, individual investors can establish goals and needs for future capital and income. Relying on vast experience and state of the art technology, these professionals sift through the various investment choices and recommend a portfolio of select equity and fixed income securities, coupled with perhaps annuities, credit recommendations, insurance products and other relevant financial information. Taken together, the individual investor can adopt a wide ranging, comprehensive asset allocation strategy that is tailored to their needs and that seeks to maximize the opportunities of achieving their financial goals. Typically, clients compensated their brokers for their recommendations and other advice that was incidental to the conduct of their business as brokers through the payment of commissions for the select securities purchased.

In recent years, there has been a trend to compensate brokers for their traditional services through fee arrangements that provide an alternative to commission-based pricing. In addition, there has been a corresponding growth in investor services, including banking type transactions (e.g., ATM, etc.) and non-bank services (online research tools, etc.), all provided by full service brokers, typically with separate fee structures. Although many individual investors have expressed interest in non-commission based fee structures for the payment of services offered by full service brokers, this demand was left unfulfilled in the marketplace as not practical in today's investing environment.

It was with this knowledge of the vacuum in financial service access arrangements that formed the impetus for the present invention.

OBJECTS AND SUMMARY OF THE PRESENT INVENTION

It is, therefore, an object of the present invention to provide a data processing system for managing an alternate account tracking and record keeping mechanism that coordinates a plurality of financial services with an asset-based fee alternative to traditional commission-based pricing.

It is another object of the present invention to provide a data processing methodology for multiple account management wherein a collection of financial services is available to the multiple accounts based upon aggregate assets.

It is yet another object of the present invention to provide a data processing system for tracking the account holdings of participating investors and periodically updating these account parameters in accordance with pre-established plan criteria.

It is a further object of the present invention to track trades of participating accounts against a pre-set limit and allow trading, without separate charge at the time of each allotted transaction, for eligible account holders in accordance with an asset-based service level.

It is yet a further object of the present invention to provide a data processing system that manages a plurality of separate investment accounts insuring each account is processed in accordance with the parameters associated with that account.

The above and other objects are realized in a novel data processing system that operates to manage a plurality of separate Account Groups formed by linking together related accounts for brokerage and other financial services and coordinates a variety of services available for use by these Account Groups in accordance with a stored protocol of asset-based fees and access arrangements. Each account in the Account Group is set up with an initial set of attributes determined by the system evaluation of account parameters, such as eligible assets. An allotment of brokerage trades is granted and stored for the account. One or more investment service access links are created for the account. System processing then proceeds on a periodic and event driven basis with the system tracking and updating account records in response to the various transactions entered by the account holder.

Corresponding to the varying aspects of the present invention, the data processing system is linked to various inter-dependent computer systems to process account transactions and report back for data management. Brokerage computer links permit order entry and execution with confirmation communicated back to the account management module. Non-transaction services, including a host of securities account services, are accessed and data transmitted in response to requests and the participant's access level. Account database structures include flags which inform the other service providers of the fee structure associated with account transactions and waiver of fees and loads if applicable. A separate module tracks the historical trading patterns of each account to insure proper fee assessment and invoke billing in accordance therewith.

The foregoing features of the present invention may be better understood by use of an illustrative example thereof as will be described hereinafter in conjunction with the following diagrams:

DETAILED DESCRIPTION OF THE INVENTION

First briefly in overview, the present invention is a data processing system with specific controlling logic, hardware interface, and database structures programmed and configured to manage a plurality of investment services accounts for individuals. The controlling system logic defines a unique processing approach wherein accounts are given access to a variety of financial services at a pre-determined fee and rate structure. System operation involves the tracking and grouping of the many accounts, assessing account activity, comparing account parameters with a stored database of account criteria, and adjusting the accounts in accordance with pre-set plan criteria.

System processing is divided into six concatenated subroutines. The first involves the account enrollment and set-up operations which are critical as the initial parameters established for the account will define its path during subsequent operations. The next area of major processing logic relates to trade utilization and directs the interactions of the account with actual security trading procedures. Integrated with the trading utilization system, the system provides for asset gathering and tracking, wherein corresponding assets are identified and recorded in accordance with client instructions and system criteria. A separate subroutine is directed to controlling the interaction among the various available services offered by the sponsoring institution. The final two subroutines are directed to billing processes and account termination. These are linked with the other subsystems to provide integrated account and transaction processing in accordance with the operating criteria.

In particular, accounts are entered into the system and various account controlling parameters are set, either by default or through account evaluation. The principal purpose of the service is to provide access to trading and a host of other important services without the payment of separate transaction charges at the time of each eligible transaction, and this forms a major segment of account tracking and record keeping. The level of ancillary services and number of allotted trades per account is determined by the amount of eligible assets. Thus, asset gathering and the associated logic governing this process is pre-set and applied to each account. Importantly, the billing logic and account termination controls are generated via programmed controlled system operation which is configured to preclude abuse of the system. In the following description, the term "account" refers to an existing account with the sponsoring institution. These are grouped or linked into collectives ("Account Groups") that are then used in processing in accordance with the system logic.

Figure 1:
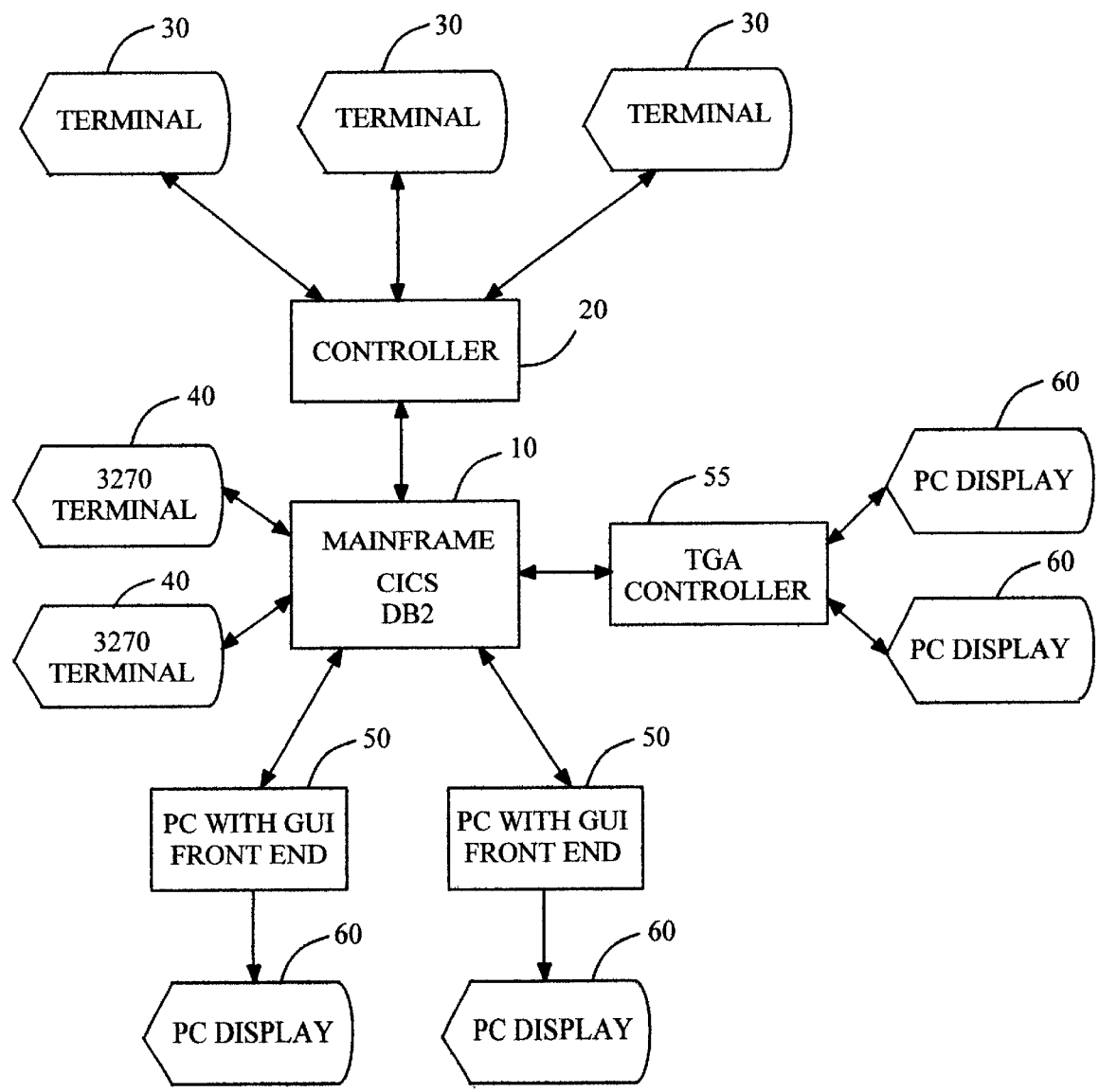
FIG. 1 provides a block diagram depicting the system configuration for the present invention.

With the foregoing brief description in mind, attention is directed to FIG. 1, which provides a system hardware perspective for an exemplary installation at a sponsor institution. Core system components are installed and operate on a Mainframe computer with data storage by DB2 or VSAM. Communication is supported by several modes, including network PC links and CICS through both proprietary and commercial controllers. Specifically, Mainframe 10 is linked to user terminals 30, for interactive program access, through the controller 20. In addition to the user terminals, program access is available through 3270 (dumb) terminals, 40. Alternatively, use of a network allows PC access, 60 either with standard GUI front end 50, or user selected front end/controller such as the TGA shell, 55 disclosed in U.S. patent application Ser. No. 642,212 the contents of which are incorporated by reference herein as if restated in full.

Figure 2:
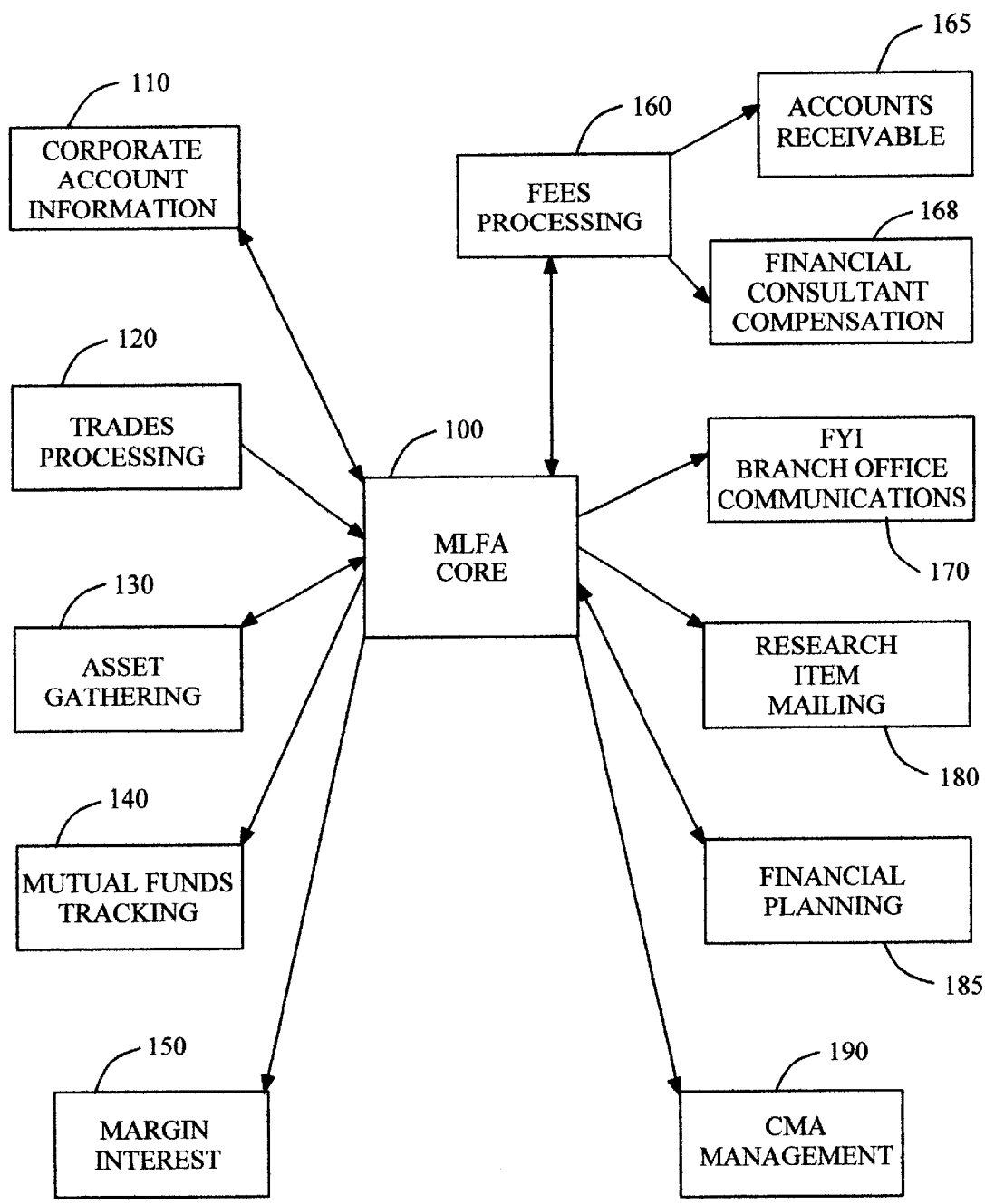
FIG. 2 provides a schematic block diagram for the system interface for the present invention.

From a programming standpoint, logic processing involves interaction with several peripheral systems to accomplish Core functionality. This is diagrammatically depicted in FIG. 2. The central/peripheral arrangement depicts the use of distributed processing from existing modules based on Core commands and file structures, 100. In this way, fee processing, 160, to calculate the fees assessed against an account, involves interaction with existing account systems to update accounts receivable, 165 and financial consultant compensation 168. Similarly, margin interest 150 is processed within existing system modules and reported back to Core. In this way, existing data processing capabilities at the sponsoring institution are accessed by the inventive system for specific processing.

Other services are implicated by the processing software and include financial planning, 185, research 180, and asset management (e.g., CMA® accounts), 190 (see U.S. Pat. No. 4,346,442 to Musmanno, the contents of which are incorporated by reference). Peripheral operations are processed in accordance with the file settings associated with the Account Groups, with results directed back to Core operations and updating of the stored records within the Mainframe storage facilities. Although not limited to such, the present invention has been advantageously constructed using Cobol language in a mainframe environment exploiting DB(2) and CICS protocols.

Figure 3A:
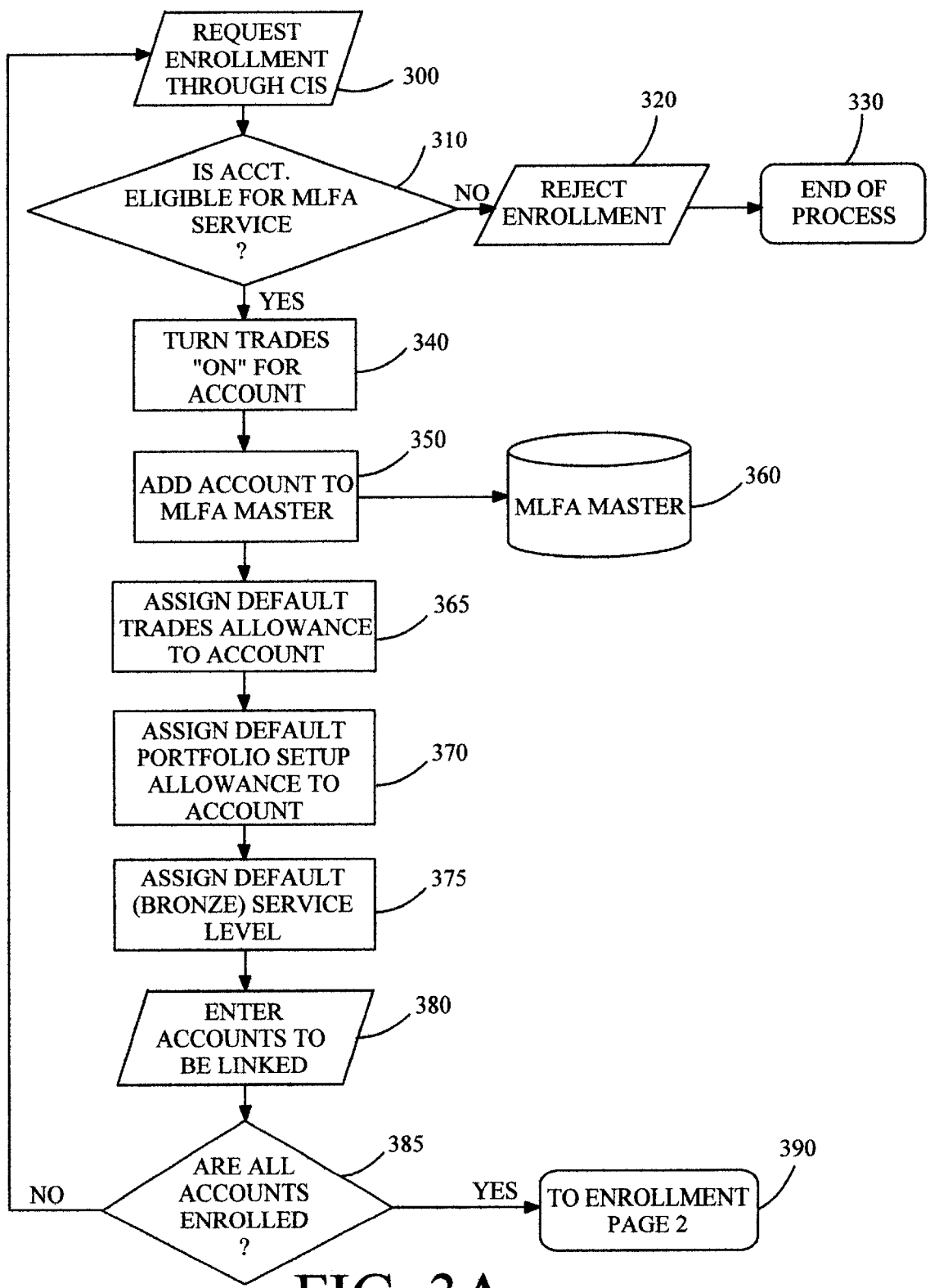
FIGS. 3A–3B provides a logic flow diagram for the enrollment and account set-up processing logic for the present invention.

Turning now to FIG. 3, the logic associated with the Enrollment process is presented in flowchart format. Enrollment involves the assessment and linking of eligible accounts into an Account Group and assigning initial parameters to the Group for controlled access to trades and services. Starting at FIG. 3A, logic begins with a request for enrollment, block 300 and test for eligibility under Core constraints, Test 310. This test assures that the account is not exempt, such as certain retirement accounts; if response is negative, logic branches to block 320 with enrollment rejected and termination of process, block 330.

If, however, a positive response is made, logic continues to block 340 and the account is first activated for allotted trades (securities trading without charge in addition to the asset-based fee); this involves setting a flag on the account file indicating the free trade access for the account holder. The account is then added to the Master file, block 350 and stored in the central database, block 360.

During the next sequence, default values are entered into the account record for three separate services. At block 365, the account is first credited with a pre-set number of trades. Then, the system sets a portfolio allowance, block 370, followed by the assignment of a pre-set service level—in this case "bronze"—block 375.

The level of service is determined by the amount of eligible assets in the eligible account(s). To attain more services—more trades and more non-transaction services—the value of the eligible assets must increase. Service levels are set in accordance with business dictates, and the levels depicted in Table I below are merely illustrative, involving current service and product offerings.

TABLE I

SERVICE-ENTITLEMENT SUMMARY

| Service Level | BRONZE | SILVER | GOLD | PLATINUM | PLATINUM PLUS |
|---|---|---|---|---|---|
| PLANNING SERVICES | •Retirement Bulider SM and College Builder ® reports | •Financial Foundation SM Service and Financial Foundation SM Update Service | •Financial Foundation Service and Financial Foundation Update Service | •Financial Foundation Service and Financial Foundation Update Service | FULLY CUSTOMIZED APPROACH |
| ACCOUNT SERVICES | Three CMA ®/CMA SubAccounts SM and certain WCMA ® accounts | Three CMA/CMA SubAccounts and certain WCMA accounts | Unlimited CMA/CMA SubAccounts and Certain WCMA accounts | Unlimited CMA/CMA SubAccounts and certain WCMA accounts | |
| ASSET MANAGEMENT SERVICES | •Classic Visa ®<br>•ATM Transactions (up to 100) | •CMA ® Visa ® Gold<br>•ATM transactions (umlimited) | •CMA Visa Gold<br>•ATM transactions (umlimited)<br>•CMA Global Gold SM Program | •CMA Visa Gold<br>•ATM transactions (umlimited)<br>•CMA Global Gold Program<br>•Unlimited specified check and other services | |
| CLIENT TECHNOLOGY | | •Merrill Lynch OnLine SM Initiation | •Merrill Lynch OnLine Initiation<br>•Electronic Bill Payment | •Merrill Lynch OnLine Initiation<br>•Electronic Bill Payment | |
| CREDIT AND TRUST BENEFITS | •25-basis-point reduction in standard Investor Credit Line SM Service rate | •25-basis-point reduction in standard Investor CreditLine Service rate<br>•An up to $500 MLCC first-mortgage closing-cost reduction | •25-basis-point reduction in standard Investor CreditLine Service rate<br>•Up to $500 MLCC first-mortgage closing-cost reduction | •50-basis-point reduction in standard Investor CreditLine Service rate<br>•Up to $500 MLCC first-mortgage closing-cost reduction<br>•Up tp $1,000 per year (up to a maximum $5,000) in accumulated credit for Merrill Lunch personal trust services | |
| EVALUATION TOOLS | •Priority Client Statement | •Priority Client Statement<br>•Wealth-Transfer Analysis | •Priority Client Statement<br>•Wealth-Transfer Analysis<br>•Qualified-Plan Review | •Priority Client Statement<br>•Wealth-Transfer Analysis<br>•Qualified-Plan Review<br>•Charitable Remainder Trust | |
| RESEARCH MAILINGS | •Theme and Profile Overview - Quarterly Edition | •Theme and Profile Overview - Quarterly Edition<br>•Global Research Highlights Weekly Edition | Choice of Three:<br>•Theme and Profile Overview - Quarterly Edition<br>•Global Research Highlights - Weekly Edition<br>•Market Analysis Comment<br>•Assessing the Investment Climate<br>•Portfolio Strategy Builder<br>•Investment Insights<br>•Fixed-Income Digest - The Taxable Edition<br>•Fixed-Income Digest - The Tax-Exempt Edition<br>•Fixed-Income Weekly | Choice of Five:<br>•Theme and Profile Overview - Quarterly Edition<br>•Global Research Highlights - Weekly Edition<br>•Market Analysis Comment<br>•Assessing the Investment Climate<br>•Portfolio Strategy Builder<br>•Investment Insights<br>•Fixed Income Digest - The Taxable Edition<br>•Fixed-Income Digest - The Tax-Exempt Editoin<br>•Fixed Income Weekly | |

To increase the eligible asset levels under consideration for service, block 380 seeks the specific accounts linked forming an Account Group undergoing evaluation for inclusion with the Master file, and these linked accounts will be added to the Master file if the user so selects. At test 385, the system determines if this is the last account; if yes, logic goes to the next routine—block 390; if negative, logic loops to the beginning and processes the next account under consideration.

Figure 3B:
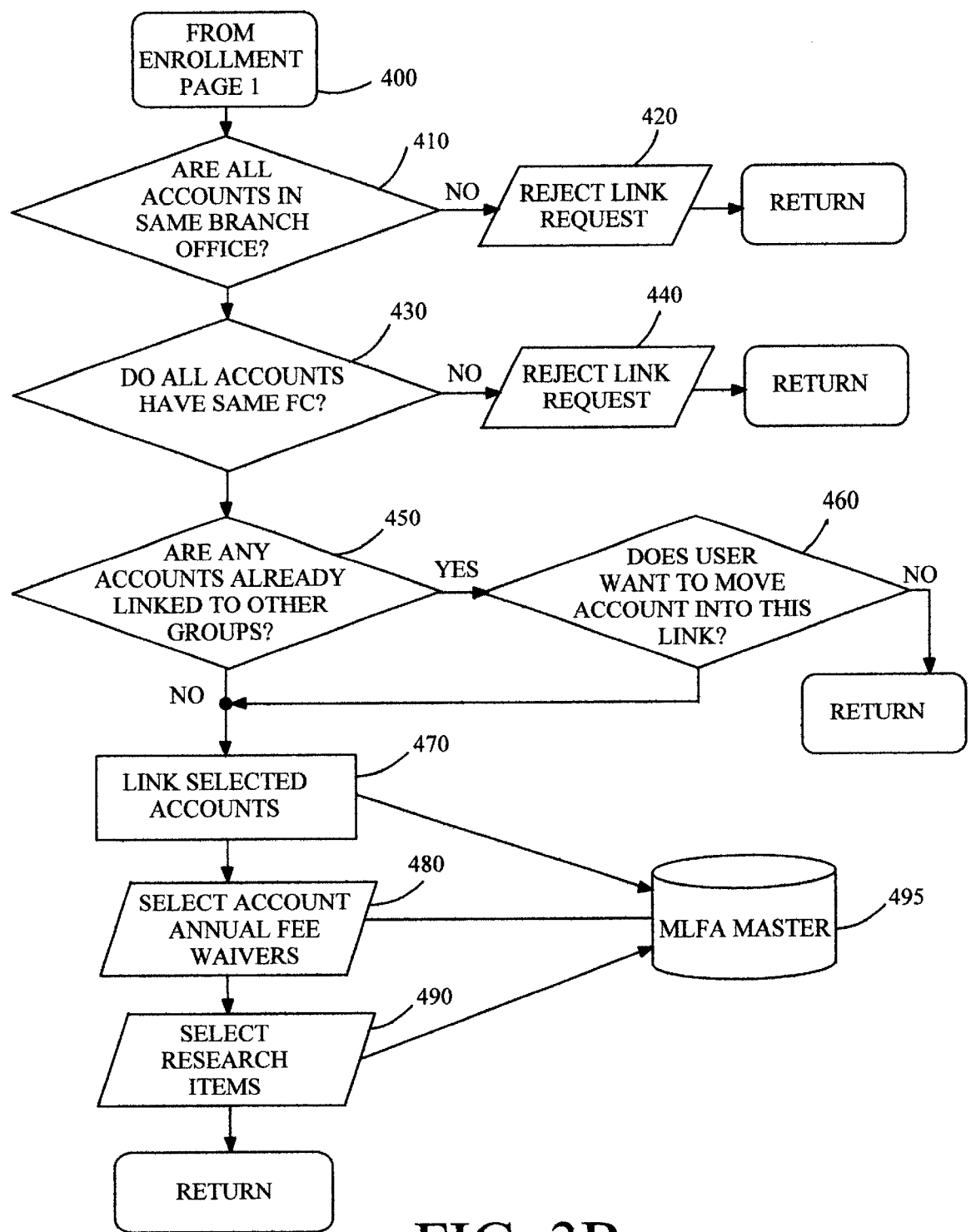

In FIG. 3B, after all the accounts are identified, the system tests to see if they exist out of the same branch office, test 410; and if they have the same company representative (Financial Consultant, "FC") responsible for client support. If a negative response is generated to either inquiry, the system rejects the account, blocks 420, 440. Finally, at test 450, the system determines if the account is already linked to another Account Group. If so, the account holder has the option to switch to the new Account Group, test 460. At block 470, the results of the previous determinations are processed and the Master file updated in accordance with the qualified selected accounts.

Importantly, it should be recognized that participants will often have a number of separate securities accounts, which may include trust, IRA, etc. By the foregoing process, only those types of accounts eligible to participate within program parameters and individually selected by the participants are included for operation.

Continuing with FIG. 3B, the participant selects possible account benefits for storage including account fee waiver, block 480, and research items, block 490, concluding the enrollment process.

Once the various accounts attributed to the participant are identified, the system embarks on an asset audit or gathering process, as is delineated in FIG. 4. In FIG. 4A, this process is particularly time sensitive and thus triggered at select event dates. In this example, the asset gathering is triggered at close of business—Friday, block 500, initiating the subroutine, 510 with results stored in the Master file block 520.

Figure 4A:
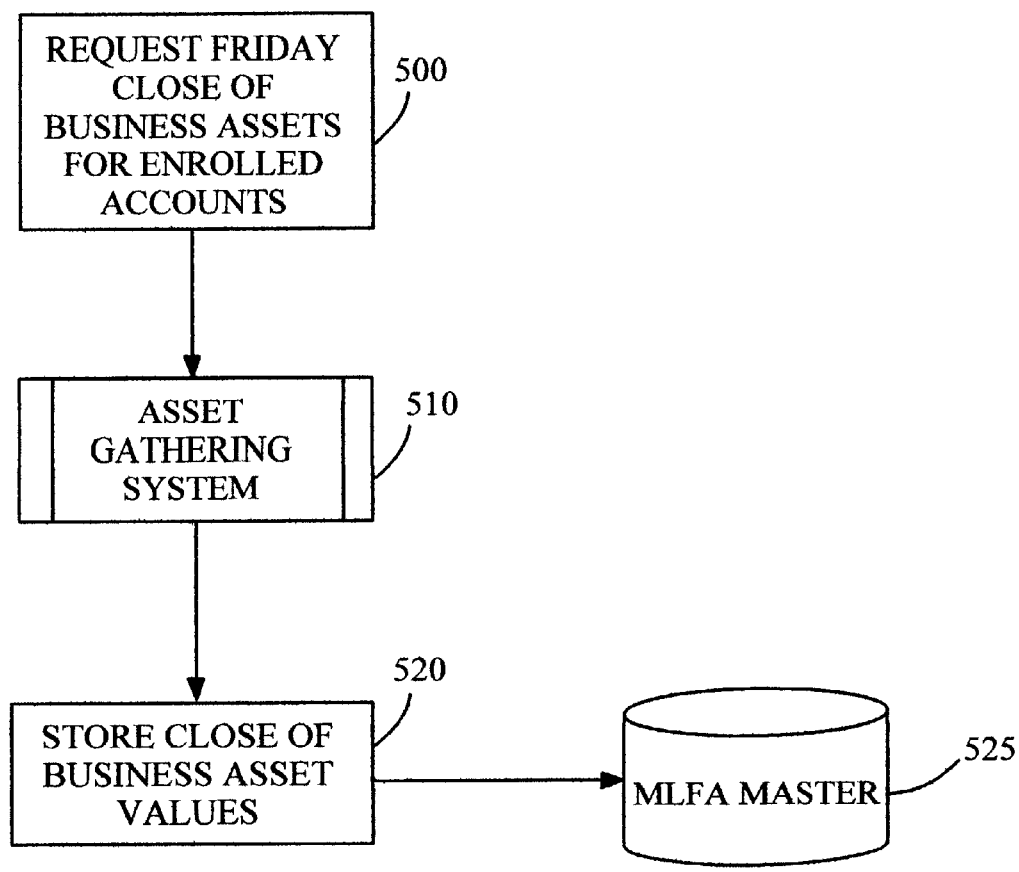
FIGS. 4A–4D provides a logic flow diagram for asset tracking and servicing subroutine for the present invention.
Figure 4B:
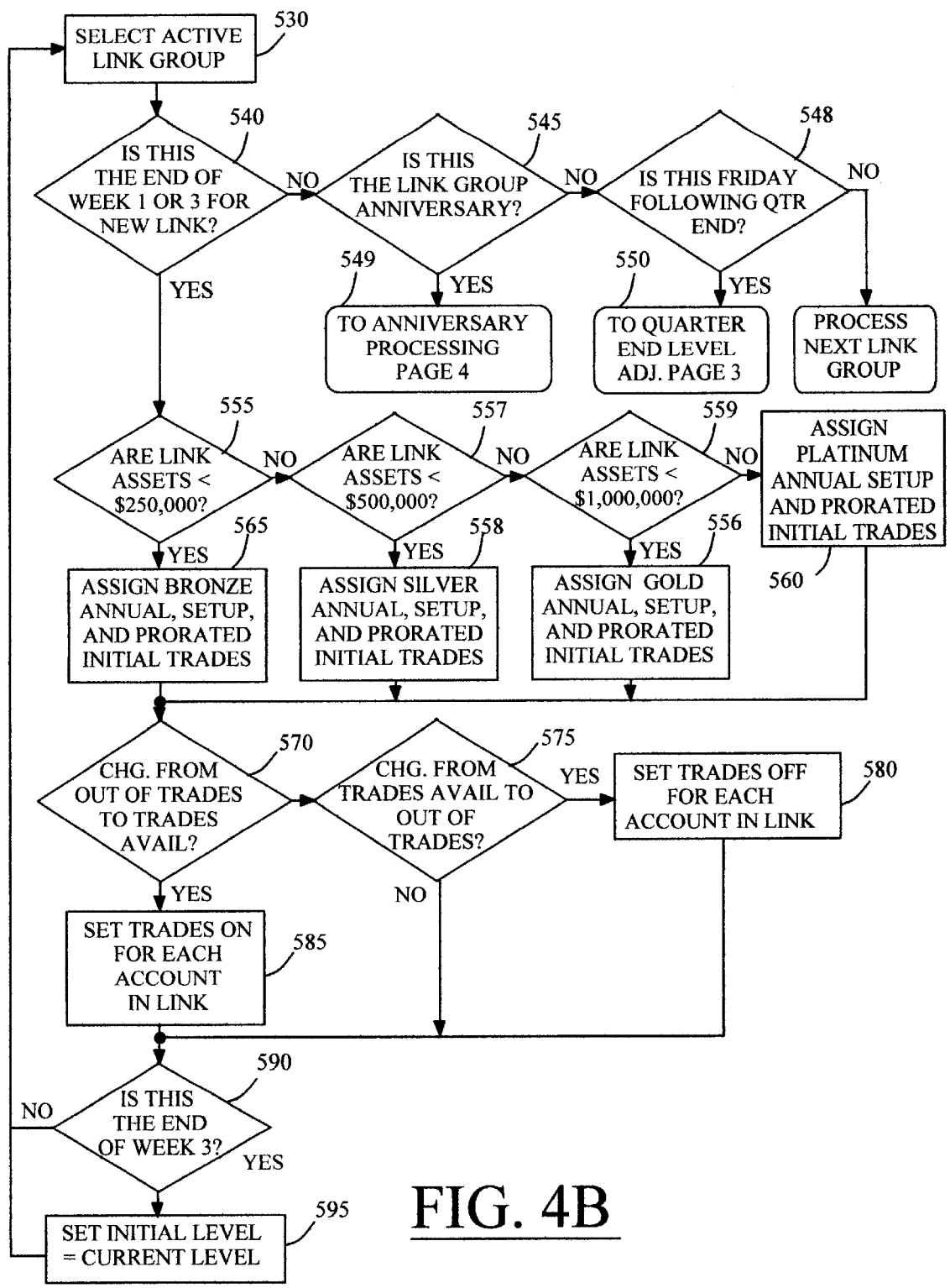

Once triggered, asset gathering proceeds under a highly restrictive regimen, as shown in FIG. 4B, with the results determining the level of service—as shown in Table I above—for that Account Group in the Master file. The process begins with the first selected group, block 530 and tests to see if this "Friday" is the end of week 1 or 3 (time from initial entry), test 540. The system performs the following service level valuations in the first month to allow the participant to decide and select eligible assets for inclusion during this time period. If not week 1 or 3, test 545 determines if anniversary date; if yes—logic is branched to anniversary processing (see FIG. 4D). If not, test 548 determines if quarterly processing; a positive response drives processing to the quarterly subroutine (FIG. 4C); a negative response to all increments the system to the next link group.

The next processing sequence determines the level of service for the new participant (i.e., week 1 or 3 processing), with test 555 assessing whether asset level is below $250,000—if yes, then a bronze level is assigned at block 565. Test 557 determines if the asset level is above $250,000 but below $500,000 with a positive response triggering the silver level of trades and other services, block 558. Continuing, test 559 determines if assets are above $500,000 but below $1.0 million; if yes, logic branches to block 556 and the assignment of gold service parameters to the Master file. And finally, a negative response to test 559 triggers block 560 and the selection of platinum as the service level with the highest number of trades and service benefits allocated to the Account Group.

Once the number of allocated trades based on service level is determined, the system must update the records as the participant may have exhausted the default trade allocation granted at enrollment—and, because of eligible assets, is entitled to more. This is accomplished during the next sequence of processing, with test 570 first determining whether the current participant is entitled to more trades due to the newly set service level. More particularly, the system tests to see if the original trade number has been exhausted, and if so, if entitlement to more trades exists based on service level. Test 575 does the contrary—it determines if the new service level warrants a removal of trades from the Account Group. Importantly, access to trading is set by entering a flag in the Master file, as depicted in blocks 585 and 580.

Finally, at test 590, the system determines if the current user is in week 3; if yes, the system sets the initial level of service=the current level, block 595.

Otherwise, logic loops back to beginning for processing the next Account Group in the Master file in batch mode operation.

Figure 4C:
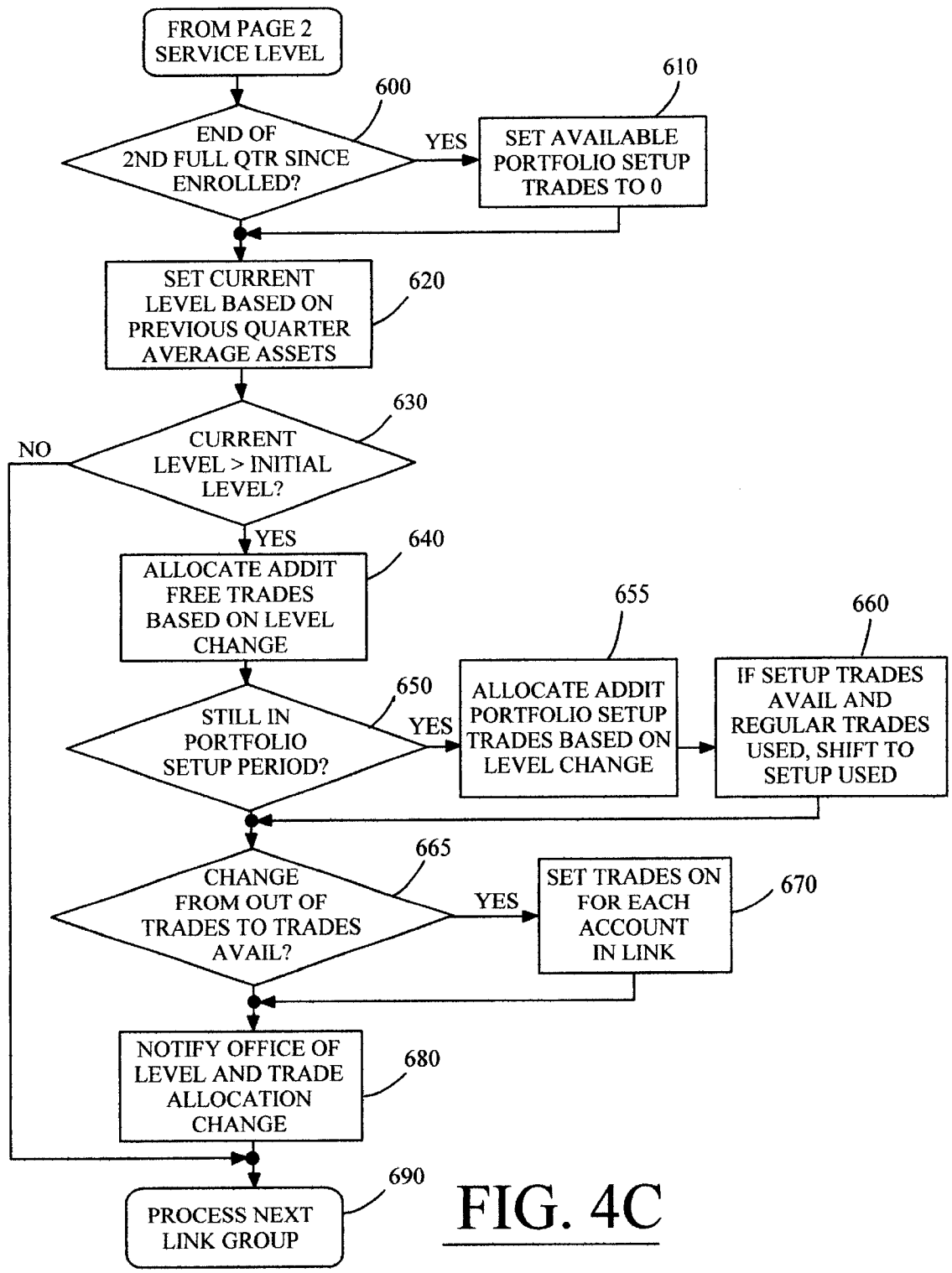

As indicated above, a positive response to 548 branches processing to quarterly process control, depicted in FIG. 4C. Logic begins in FIG. 4C with test 600 which determines whether the file is at least into the $2^{nd}$ full quarter since enrollment. If so, the portfolio set-up trades is set to zero (i e., the initial default trades are removed). In either event, the current service level is adjusted to reflect the past quarter assets (averaged) at block 620.

At test 630, the system detects whether a change of service level is necessary. If so, logic proceeds to block 640 and the system allocates the appropriate number of new trades in accordance with the new service level attained per the change in asset base. Again, at test 650, the system decides if the setup period is still ongoing; if so, at block 655, additional trades are allocated in accordance with the new service level, while at block 660, the system uses the remaining setup (default) trades assigned to the Account Group.

With the new trade allocation, test 665 tests whether the Account Group needs to be changed from out of trades to trading available. If so, the new allocation is assigned to each of the accounts linked together into the asset group, block 670. The records and associated offices are notified of the changes to the Account Group, block 680. In this example, the setup period extends for six months.

Figure 4D:
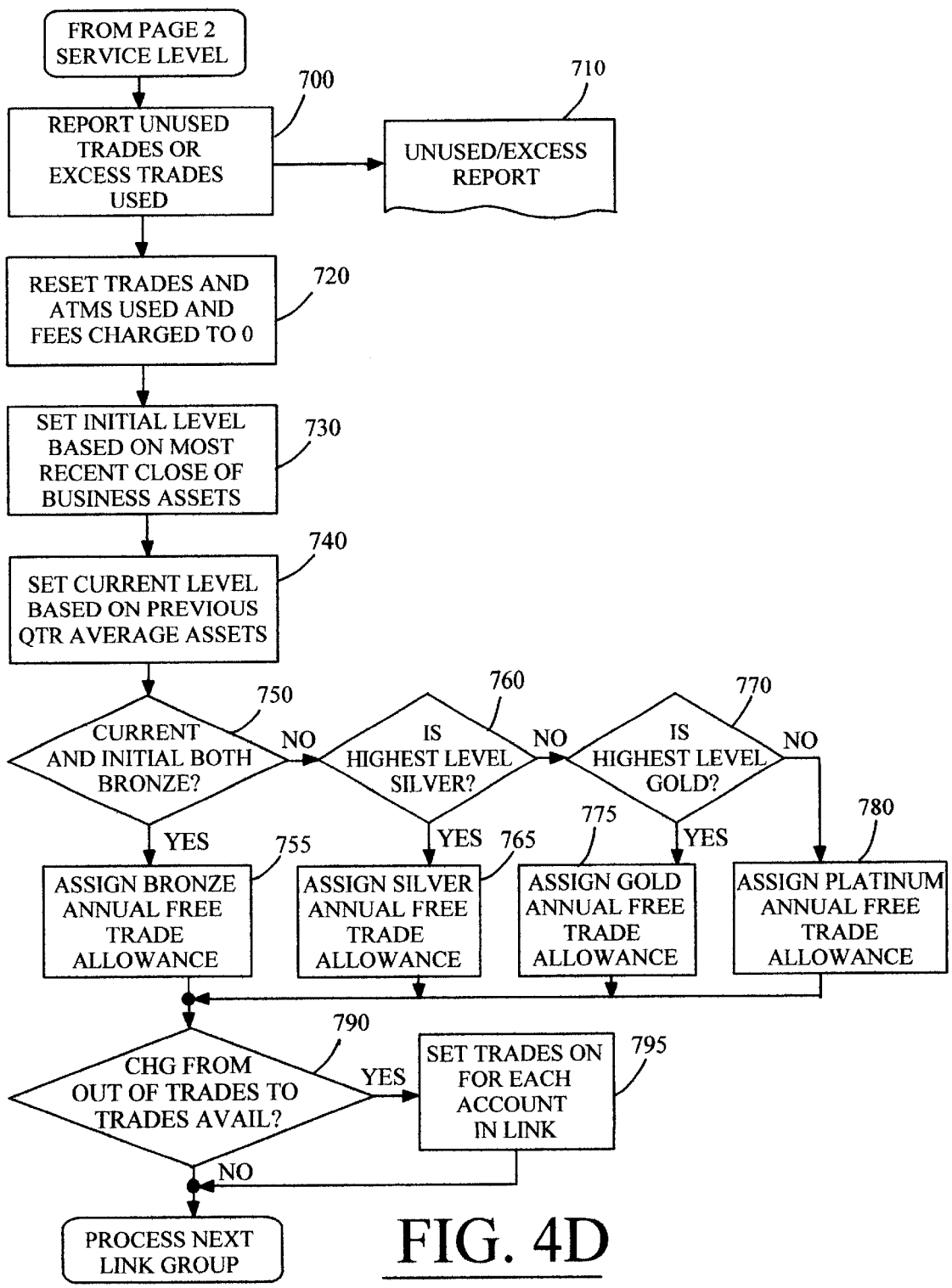

Turning now to FIG. 4D, the anniversary processing logic for the service level processor is presented in logic flowchart form. The system first reports on unused/excess trades for the account, block 700, with printout at block 710. At block 720, the system resets trades and other quantitative services (e.g., ATMs) back to zero. At block 730, a new initial level is determined in accordance with then present asset base, and assigned to the Account Group. Simultaneously, the system sets a new current level based on the average asset base for the preceding quarter, block 740. Based on these settings, test 750–770 assigns the appropriate service level for the upcoming year. This approach, although complicated, provides assurance against most forms of asset switching that would otherwise create entitlement to services not earned. In accordance with these tests, the proper level is assigned by the system via blocks 755–780. Again, test 790 confirms that an Account Group that has exhausted the trades will be reactivated with the new allocation, block 795.

Trade processing is an important aspect of the present invention and the controlling logic is depicted generally in FIG. 5. Entry into trade processing is through block 800 with the first test determining whether the accessing account is enrolled with the program, test 805. If so, logic continues to test 810 which determines whether the pass is tied to an earlier transaction on the same account and involving the same securities (test 815). A positive response triggers a system waiver of charge or commission as the order is piggybacked onto the first related transaction, block 820.

The next sequence tests, via test 825, for a busted trade, i.e., a trade that has been rejected and thus never consummated by the participant. If so, the trade counter is reset to reflect the busted trade, block 830 (see FIG. 5C). This is followed by a test to determine if the trade is of a product designated transparent (or free) to be traded. Again, if positive, the trade counter is updated to reflect the transparent trading event, block 840 (see FIG. 5B).

The foregoing trading data is then stored in the requisite record location for each of the Account Groups accessed, block 845 via non-volatile storage 850 in the Master file. The trade is then executed using established trading processing tools, such as a TSS system disclosed in U.S. Pat. No. 4,674,044 to Kalmus, et al. the contents of which are incorporated herein by reference.

An important feature of trading under the present invention is the tracking and record keeping of allotted trades under the particular account service level. The present invention accomplishes this task by implementing a trading counter triggered for each trading event for the relevant account and group. This is depicted in general terms in FIG. 5B, below.

In accordance with the governing logic structure, the system first tests to determine if the trade execution involves a mutual fund, test 900. If so, logic branches to block 905, wherein the NAV of the fund is determined (NAV is an acronym for net asset value). Logic continues to test 910 which confirms a sale or exchange, or is it an employee account, test 915. Under this particular regimen, only buy orders for mutual funds (by non-employees) trigger a decrement to the trade counter, and the foregoing logic path assures this outcome.

Assuming a negative response to test 900 (not a mutual fund), logic goes to test 920 to determine whether the trade for free field for the account is "active" or "on". If so, at block 925, the system "waives" the standard commission for the transaction. Next, the system tests at 930 whether the transaction is an AIP (automated investment program—where a periodic investment is automatically booked at a set cash or share amount automatically); if not, the transaction and logic pass to block 935 where the system decrements the trade counter by 1.

Once this has been done to the account, the system determines at test 940 whether the account has three trades left in the counter, or one trade left; in either event the responsible office for the account is notified regarding the approaching exhaustion of the account trade bank. Finally, if the last trade is executed, the system deactivates the allotted trade flag on the record for each account within the Account Group, block 960.

Figure 5A:
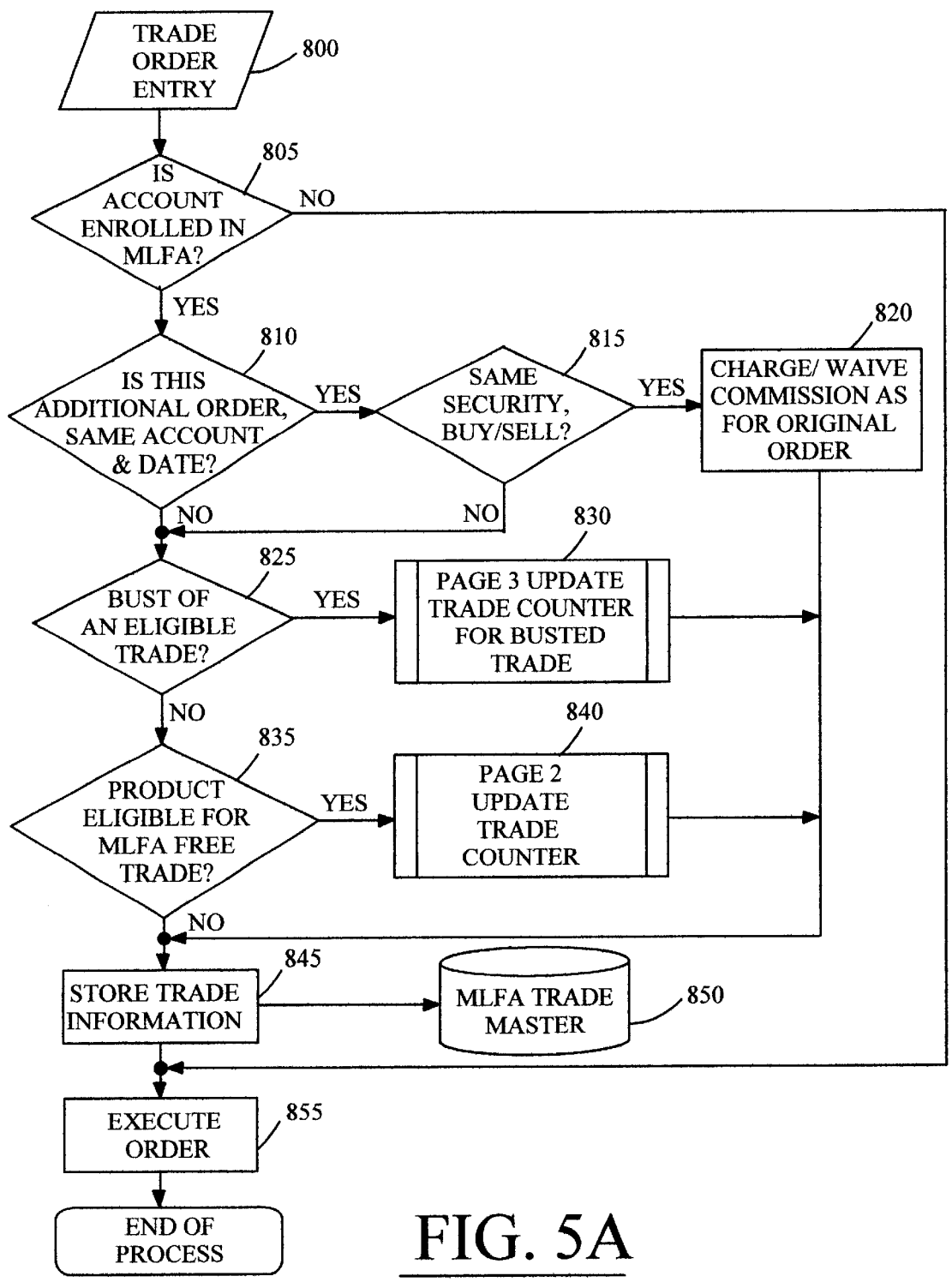
FIGS. 5A–5C provides a logic flow diagram for the trade processing subroutine for the present invention.
Figure 5B:
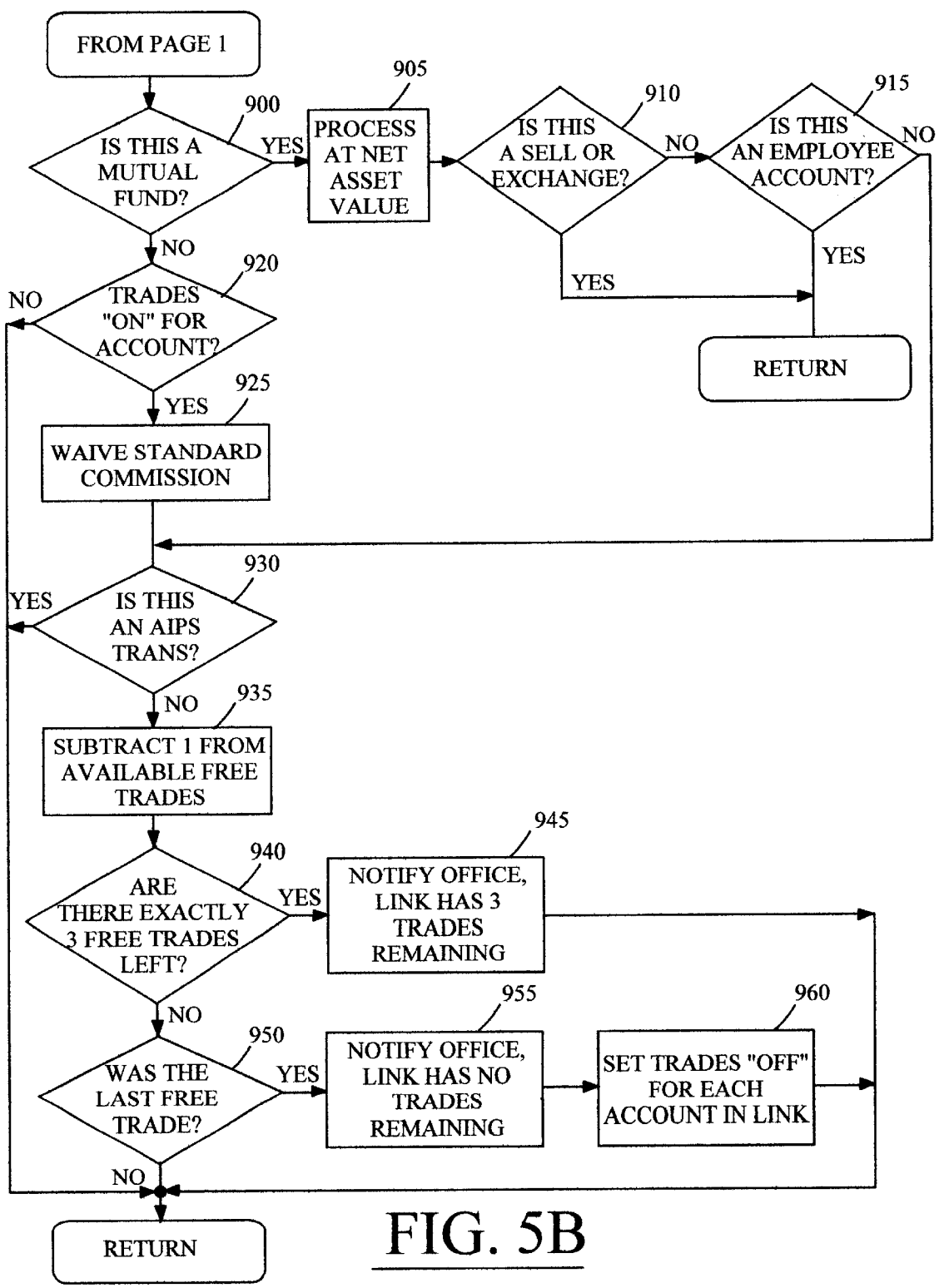
Figure 5C:
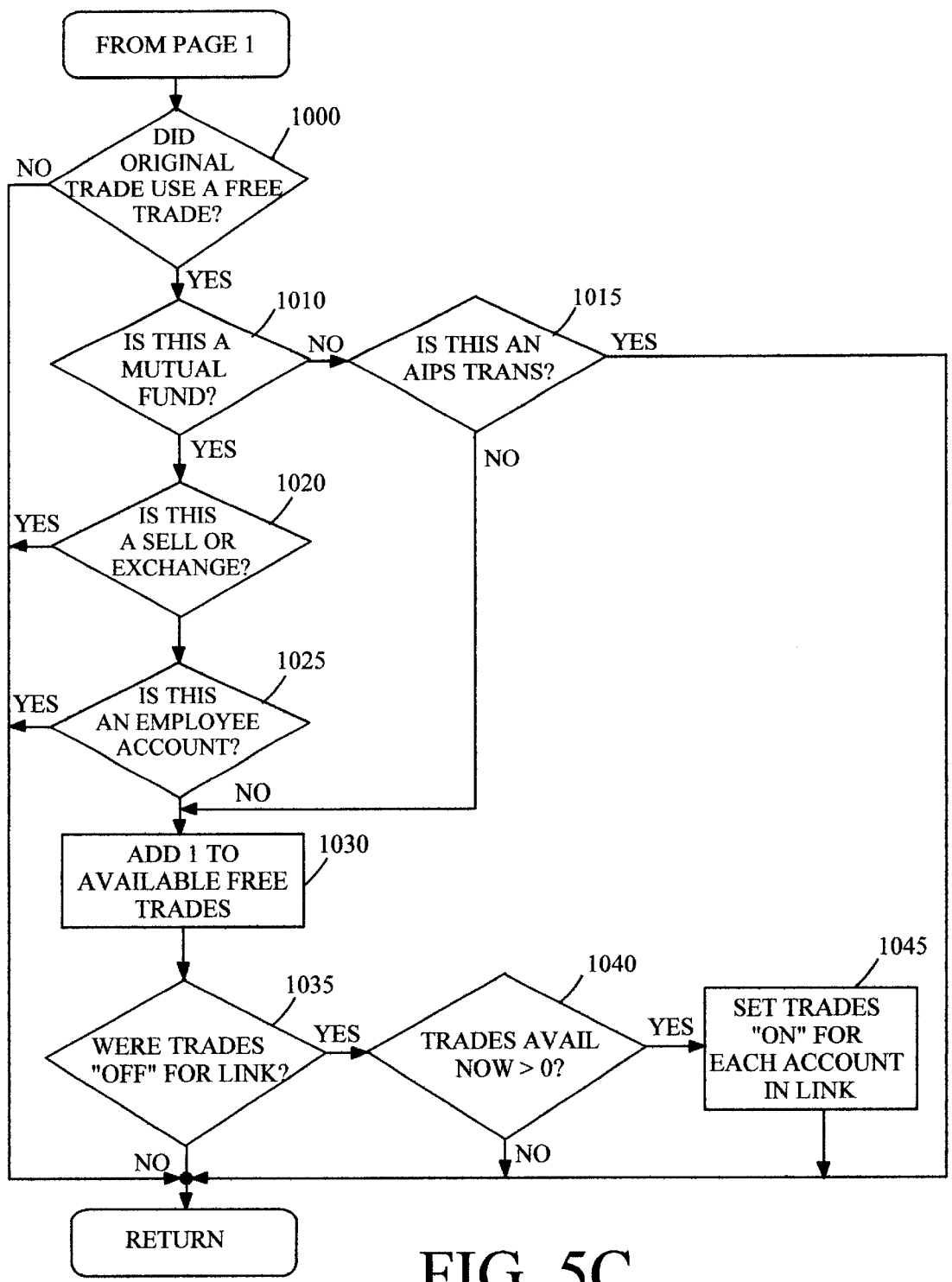

In FIG. 5A, the system included processing for a busted trade. In the next figure, (FIG. 5C) the logic controlling the update of the allotted trade counter is depicted. This is important as the system must credit the account for a busted trade—but only if the account actually used an allotted trade in the first place. Thus at test 1000, the system determines if an allotted trade was used in the busted transaction; a positive response to this test sends logic to test 1010 to access whether a busted trade was a mutual fund. If yes, logic tracks through tests 1025 and 1030 to determine if a "sell" or if for an "employee"; only a negative to these tests will trigger the incremental credit generator, block 1030. Similarly, if not a mutual fund, and not an AIPs trade, test 1015, the system will generate a trade credit at block 1030.

Once credited, the system must then determine whether the new credit impacts trading access. This is accomplished at test 1035, wherein the system discerns whether the trade access file entry had been deactivated; if yes, logic branches to test 1040 to confirm a positive total of trades in the counter—and block 1045 to re-activate allotted trade access in response to a positive counter value for the linked accounts.

Figure 6A:
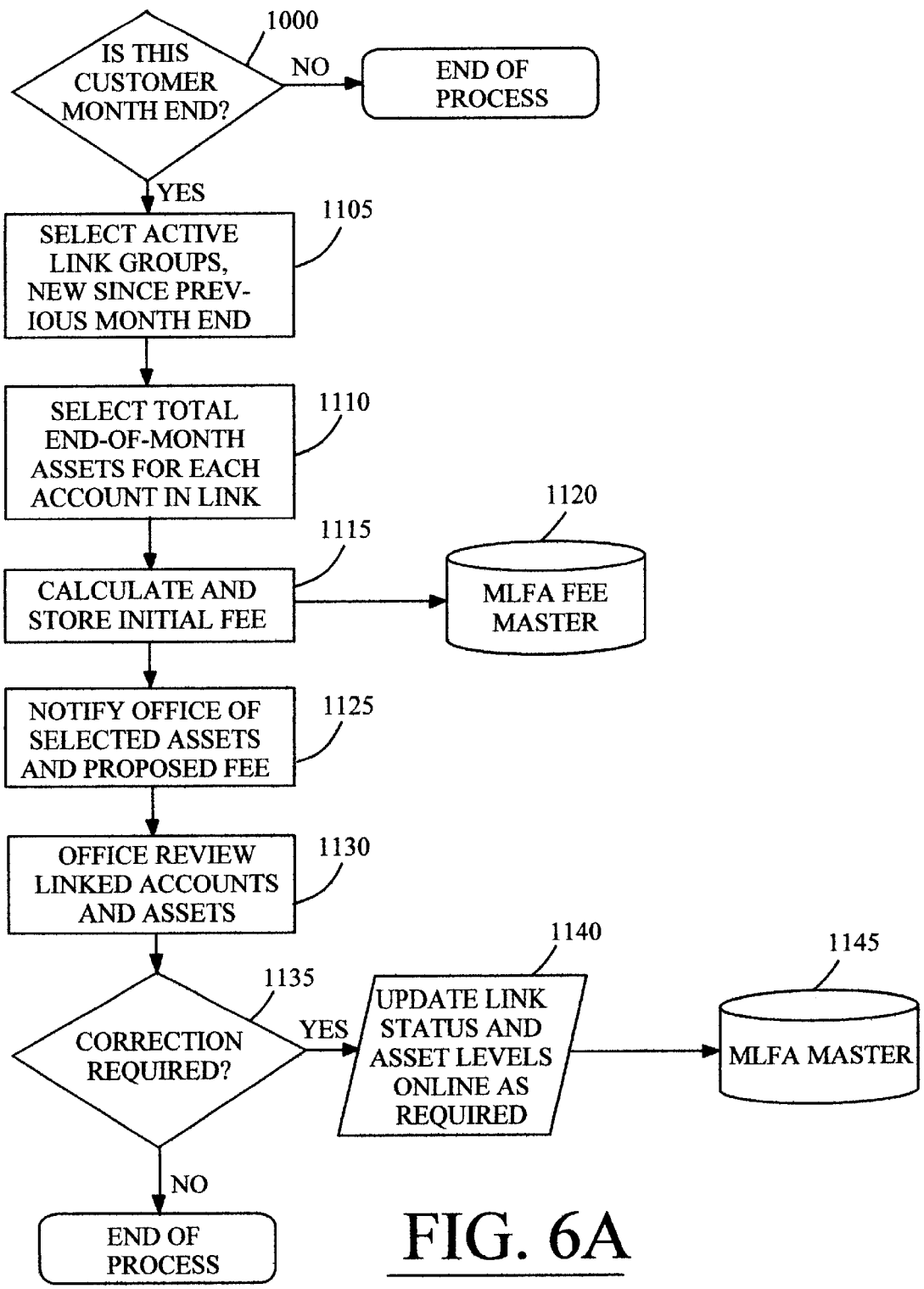
FIGS. 6A–6D provides a logic flow diagram for the account fee and billing subroutine for the present invention.

For commercial system implementation, billing becomes a critical function that requires accurate and understandable processing in fee assessment per linked account(s). The governing logic controlling fee calculations are presented in the next sequence of figures, starting at FIG. 6A. Recognizing that both service level and fees are contingent on total eligible assets linked into the Account Group, the fee assessment begins with test 1100 to discern end of month processing. At block 1105, the active link groups are selected, followed by block 1110 and the selection of the total assets for the link accounts. Based thereon, the system calculates an initial fee assessment, block 1115 and this is stored, block 1120.

To insure the absence of error, the system provides an iterative check in fee assessment starting at block 1125 with the notification of the account's local office and their review of the fee calculation at block 1130. Test 1135 determines if correction is needed; if so, this is accomplished at block 1140 followed by the updating of the Master file in accordance with the corrected values.

Figure 6B:
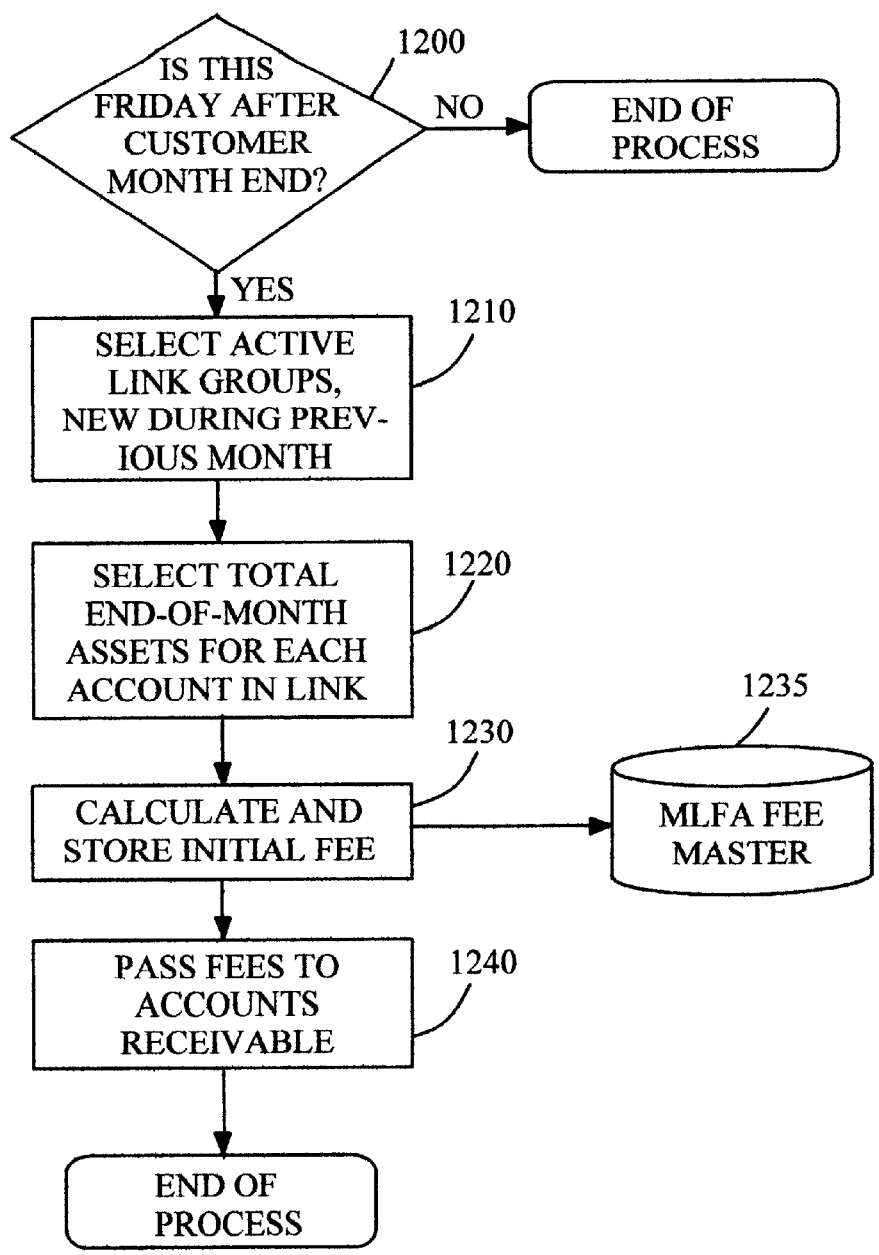

In FIG. 6B, the finalized initial fees are processed, beginning at test 1200 establishing the periodic date for fee finalization. If the right date (here Friday), logic continues to block 1210 for selection of active link groups during the previous month. Based thereon, the total end of month eligible assets are aggregated for each account in the link, block 1220 and used to calculate the initial fee, which is then stored, block 1230. These values are then passed to accounts receivable for invoicing and collection, block 1240.

Figure 6C:
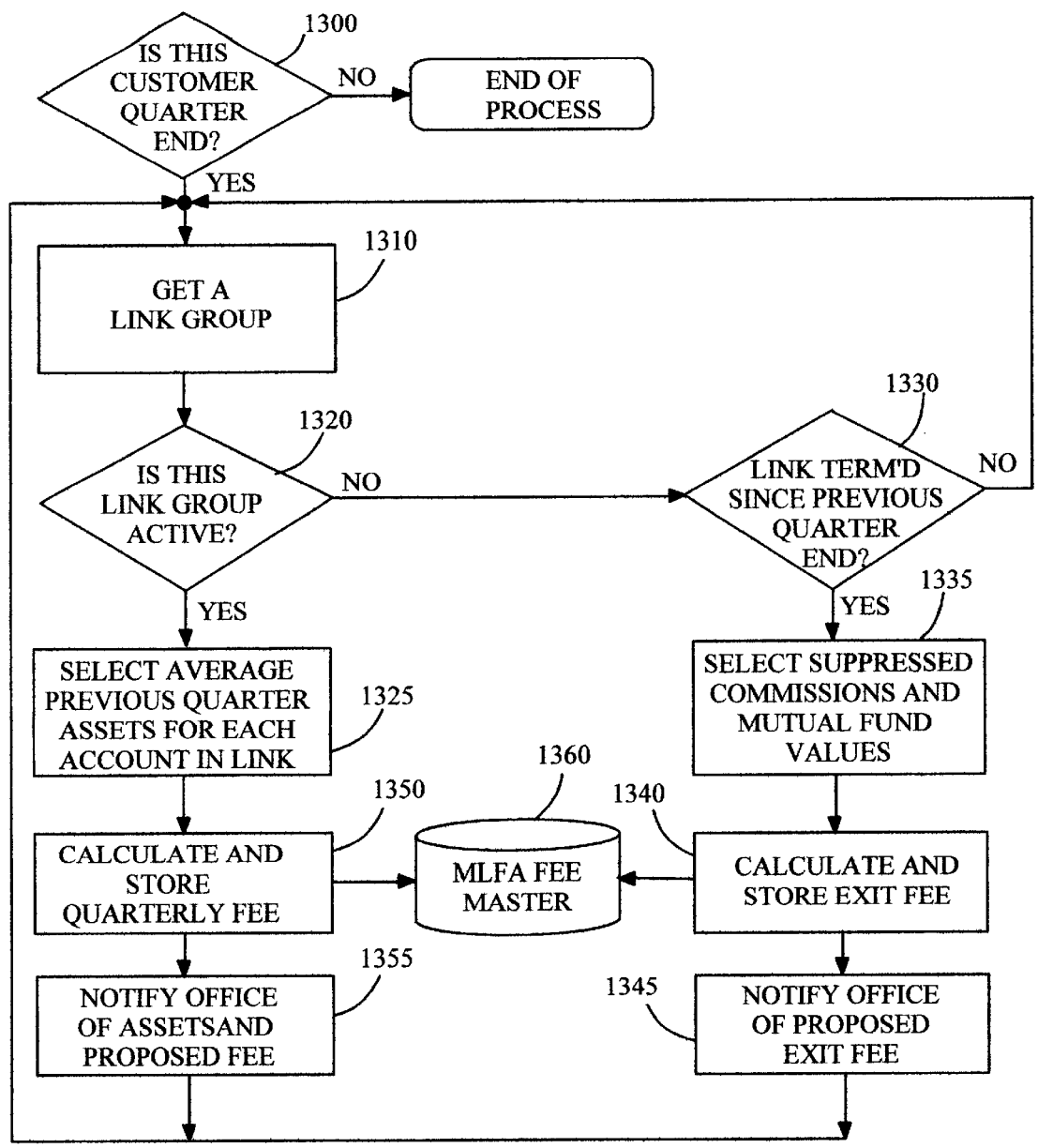

The next billing sequence involves quarter end billing, depicted in FIG. 6C, and begins with the period confirming test, 1300. If at the end of the quarter, the system accesses the relevant link group, block 1320, and determines if the group is active, block 1320.

If the group is active, logic continues to block 1325 to gather the assets for the linked account and the quarterly fee is then calculated at block 1350; and stored at block 1360.

If the group is inactive, logic branches to test 1330 and the system discerns whether account is terminated. If not, logic loops to the beginning; if terminated, logic continues to block 1335. At this stage, the suppressed commissions and mutual fund values are selected and a closing fee set, block 1340. In either pass, the system notifies the controlling office of the new fee to the account—blocks 1335 and 1345, respectively.

Figure 6D:
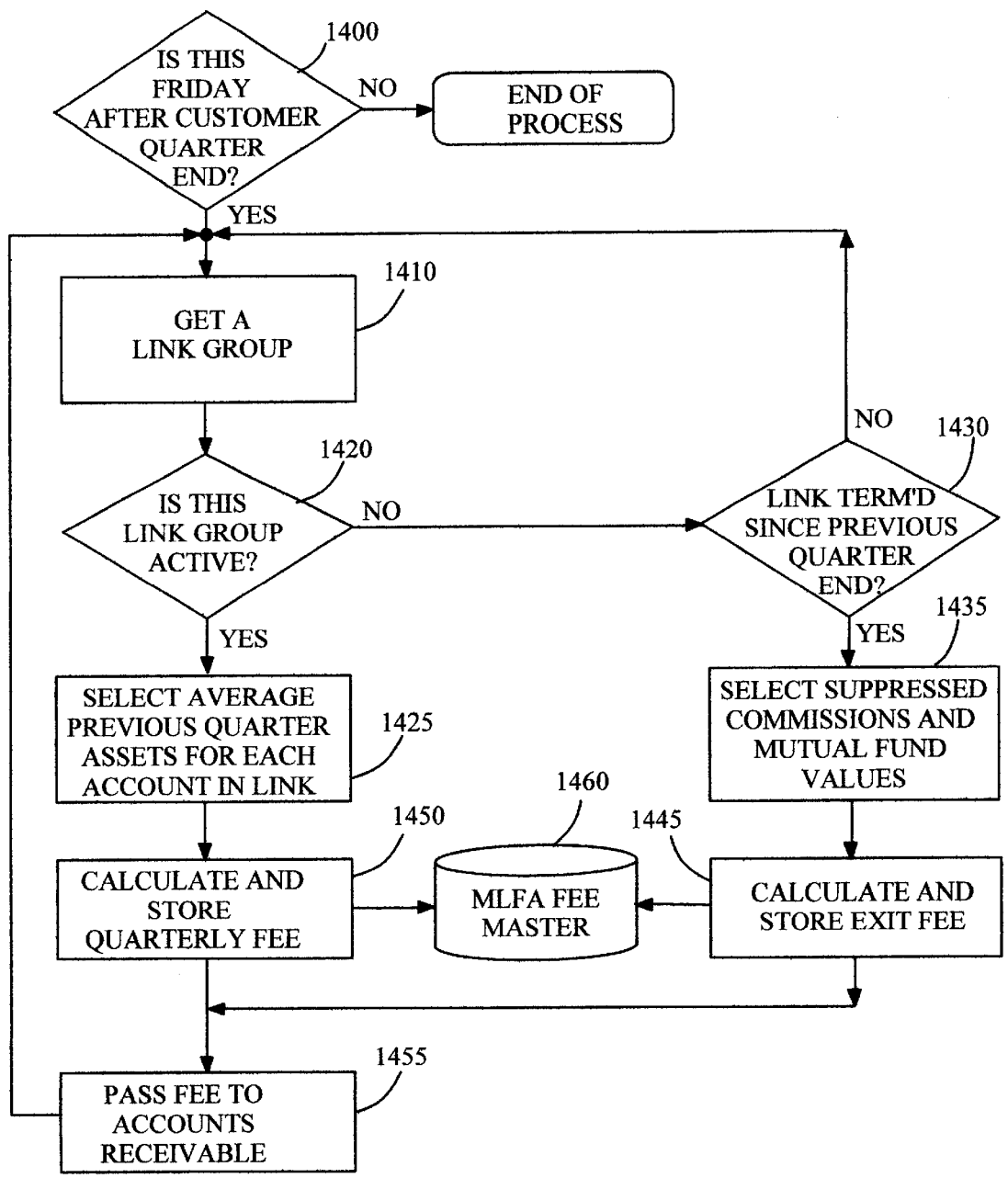

Final billing proceeds in almost the exact same sequence and is depicted in FIG. 6D. This process, however, begins on the Friday after the closing quarter, test 1400, and results in the actual fee assessment to accounts receivable, block 1455.

Turning now to FIG. 7, the programming logic underlying interaction with a variety of financial asset management services provided by the sponsoring institution are depicted in a series of sequential flowcharts. Financial services are typically offered through one or more separate divisions within the sponsoring institution, and, therefore, charges are separately accounted and reported. The present invention employs a status file that is available and accessed by the separate division during the course of providing the financial service to the account holder. This file comprises the data structures that will indicate the fees status of the service user, and whether the fees are waived.

Beginning at Block 1500, the active account is accessed from the Master file, and, if the last to be processed (test 1505), triggers the end process block 1509. In either event, the system sets the account service access file entry to "on" for access to free financial plan access, block 1511. Logic then continues to test 1513, and the account fee entry "waived" is checked, with a positive response setting the account service access file entry for this benefit to "on", block 1515.

The next sequence tests whether the account is accorded platinum service level—at test 1517; if yes, logic branches to blocks 1519, 1521, and 1523 and the entry of fee waivers for fed fund transfers, estate legal transfer, and return deposit fee waiver, respectively. Thereafter, the foregoing fee waiver data, as collected, is written to file, block 1525 and stored, block 1527.

Figure 7A:
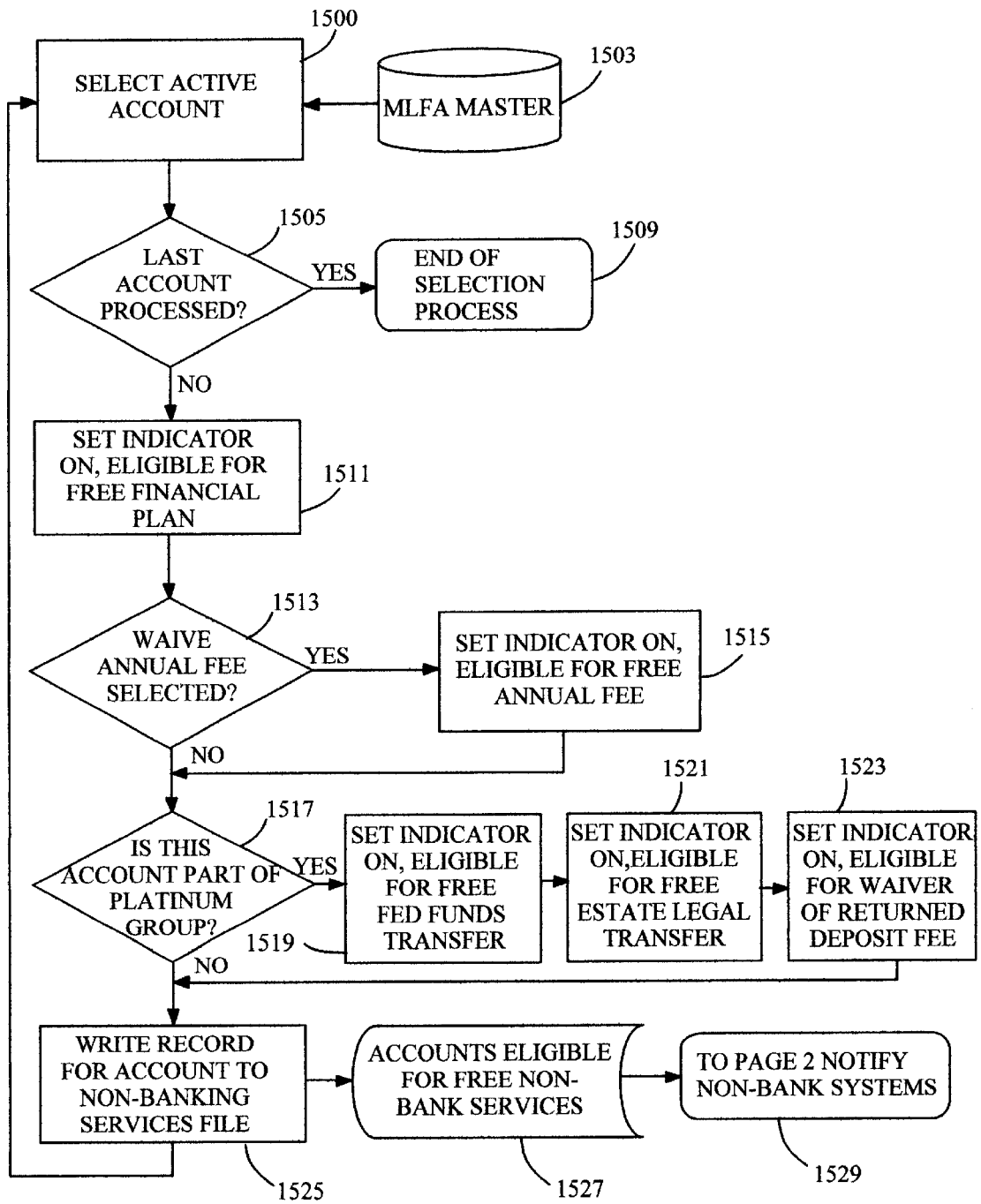
FIGS. 7A–7E provides a diagram for the auxiliary service process of the present invention.
Figure 7B:
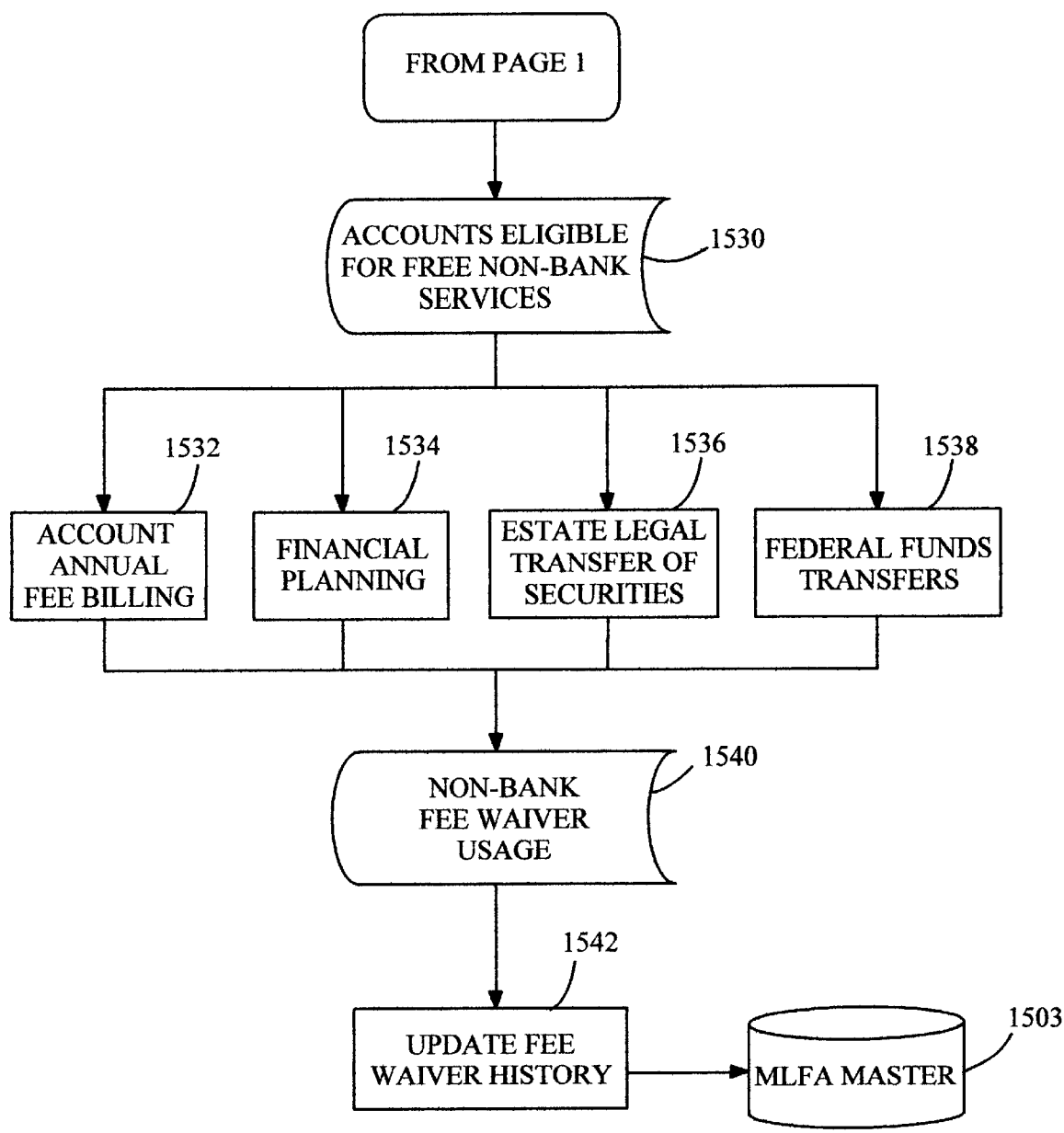

Continuing with FIG. 7B, the foregoing non-bank service file structure is then implemented each time the account participant uses one of the indicated services. In particular, the accessed service will recall the associated service file, block 1530 and check the condition for the fee entry—with fees governed accordingly. This includes in this example, access to account annual fee billing, block 1532, financial planning, block 1534, estate transfer of securities, block 1536, and fed fund transfers, block 1538.

Continuing, whenever a waiver is trigger, a usage is recorded, block 1540 and stored in a waiver usage file, block 1542 so that the system maintains a historical account of all user service access that triggers a fee waiver.

Figure 7C:
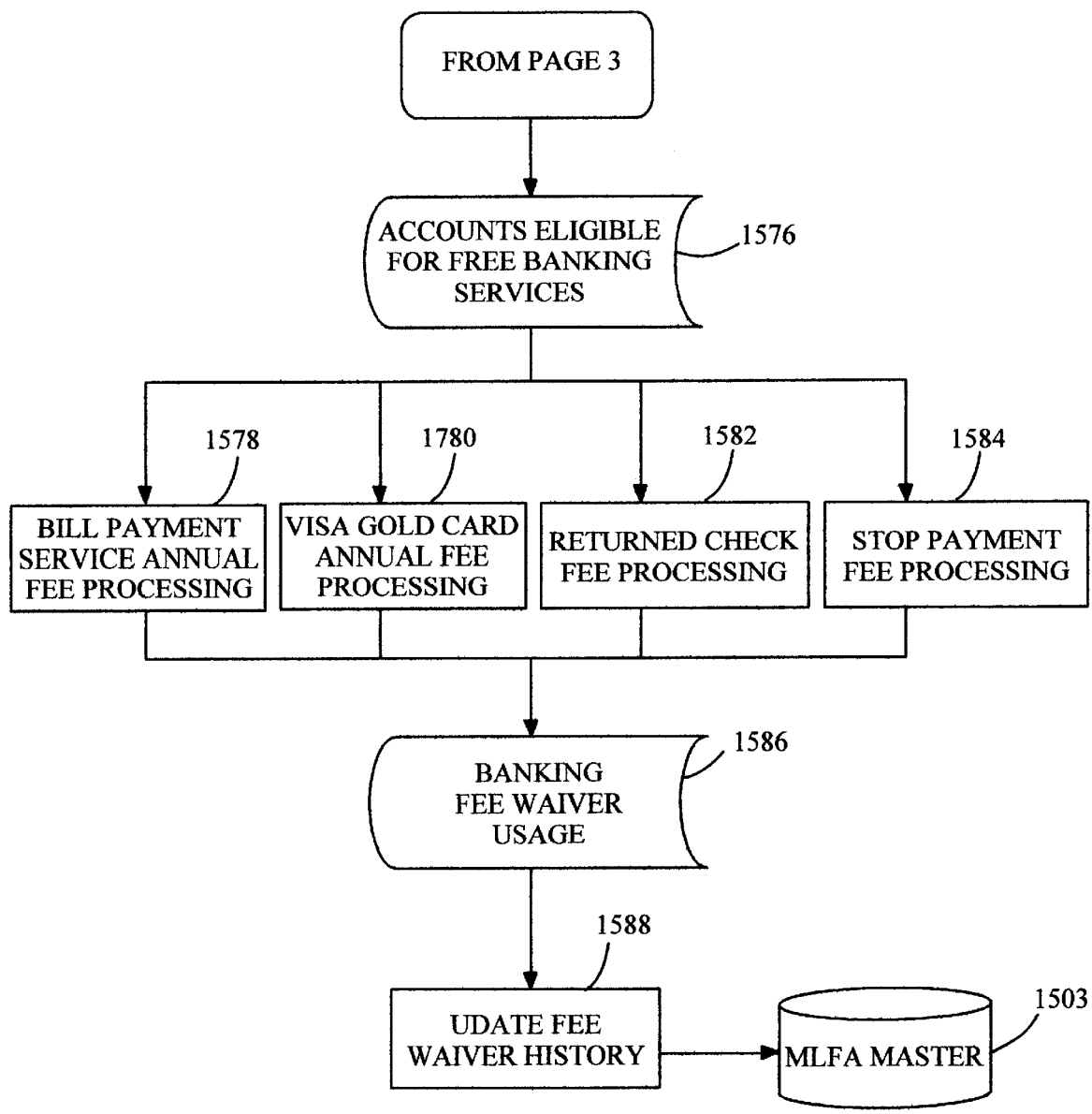

In FIG. 7C, the governing logic for bank service access is depicted in flow chart form. After checking to see if the processed account is the last one, block 1543 and test 1545, the system determines if the account is at the bronze service level, test 1547. If so, test 1549 establishes whether the entire allotment of ATM access allowance has been exhausted. If the ATM allowance has been used, logic turns the flag in the access file to "off", block 1551; otherwise, block 1553 sets the flag "on".

For all other levels of service, ATM usage is free and unlimited, block 1555. This is also true for free Visa gold card, block 1557. If the service level is silver, test 1559, logic branches skipping block 1561 which provides for free bill payment services to service levels above silver.

If level is above gold ("no" to test 1563), block 1565 sets the access flag on for free fed fund transfers, block 1567 sets the access flag on for free estate legal transfer and block 1569 sets the return deposit waiver on.

The foregoing access flags are then written to the banking services file, block 1573, which is stored with the Master file for that Account Group, block 1575.

Figure 7D:
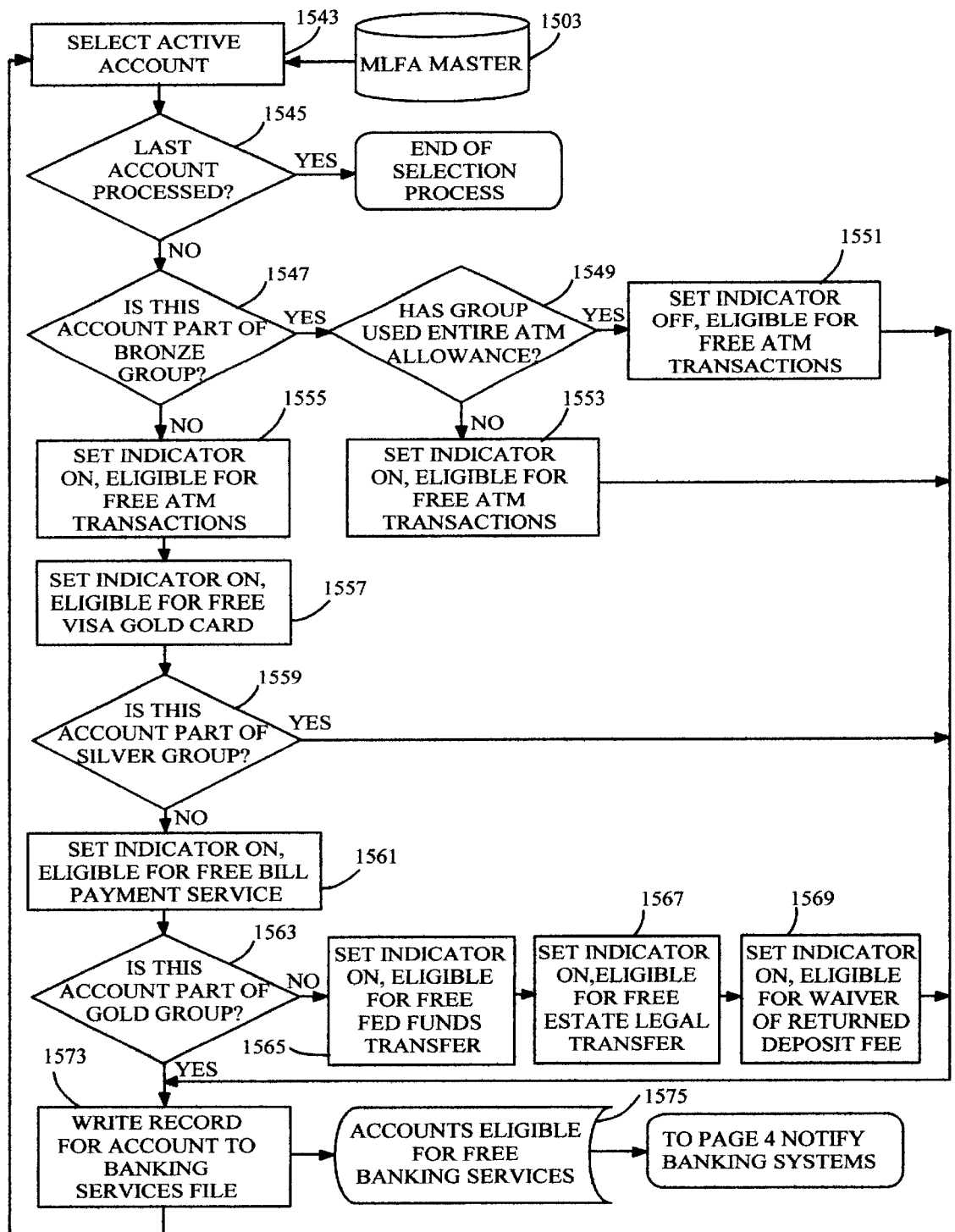

Paralleling the logic of FIG. 7B on non-banking services, FIG. 7D reflects system interaction with various support systems for bank related services. The service access file is pulled, block 1576 and thereafter read during the system interaction with the bill payment service, block 1578, the visa gold processing system, block 1580, the check processing system, block 1582, and the stop payment processing, block 1584. During each instance, the system records associated fee waiver events, file 1586 and stores this historical picture in the Master file, block 1588.

Figure 7E:
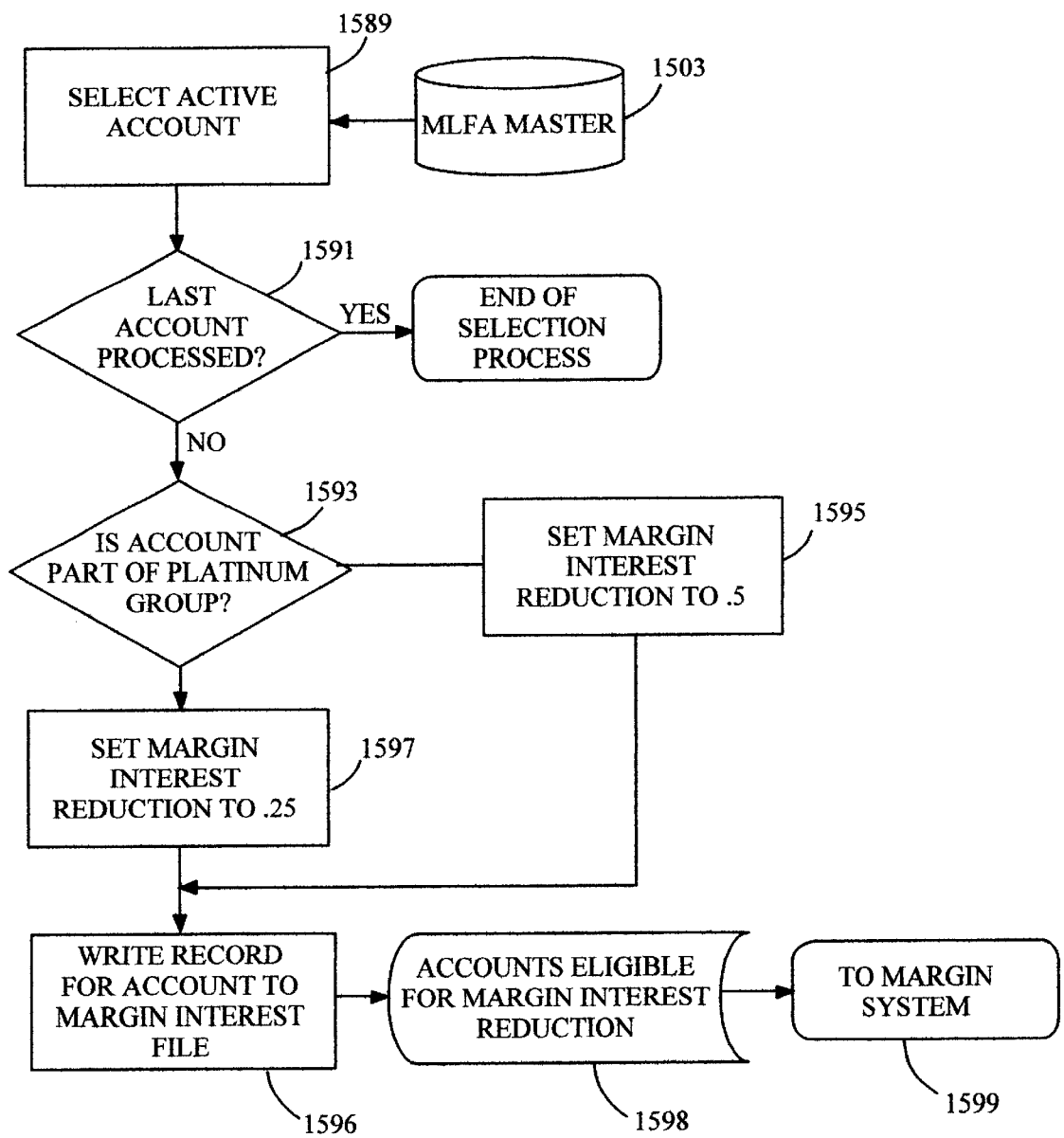

The final service access sequence is depicted in FIG. 7E and relates to platinum access to reduced margin interest rates. After testing sequence, test 1591, logic confirms service level—platinum or not. If platinum, block 1595 establishes a 0.5 percent drop in margin interest. All other levels result in a 0.25 drop in margin interest, block 1597. The new margin rates are then written to the margin interest file, block 1596 with the resulting file transmitted to the margin access system, blocks 1598–1599.

Figure 8A:
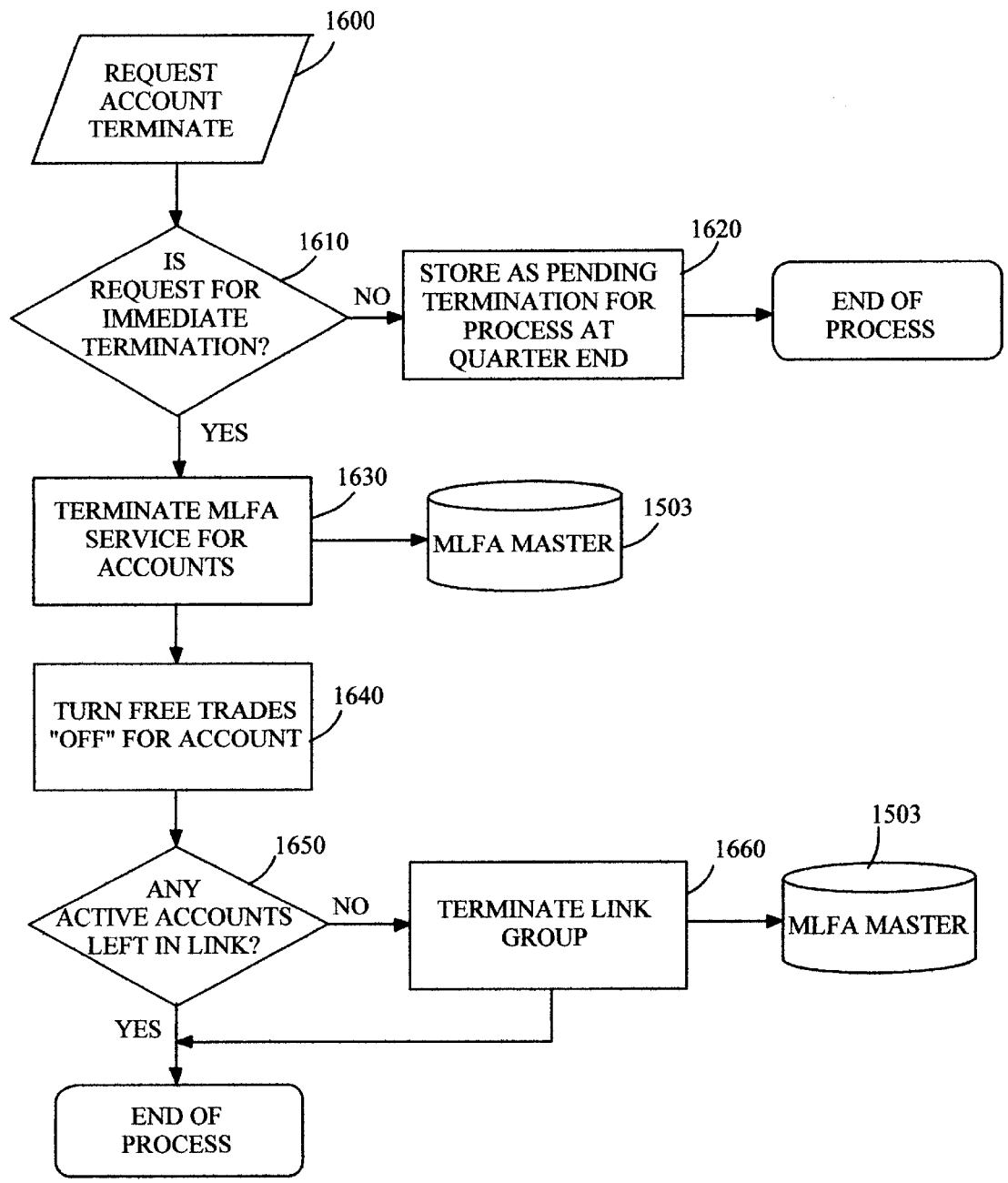
FIGS. 8A–8B provides a logic flow diagram for the account termination subroutine for the present invention.

Turning now to FIG. 8A, the system permits termination of one or more accounts within a linked Account Group and processes the individual accounts in accordance with the following logic. The termination request, block 1600 triggers test 1610—which determines if the selected account is to terminate immediately or at quarter end, block 1620. If immediate, the system logic stores the termination status with the Master file, and instructs the various system functions for that account accordingly; trades are deactivated, block 1640 and, if no additional accounts in the Account Group are left active test 1650, the group is terminated at block 1660.

Figure 8B:
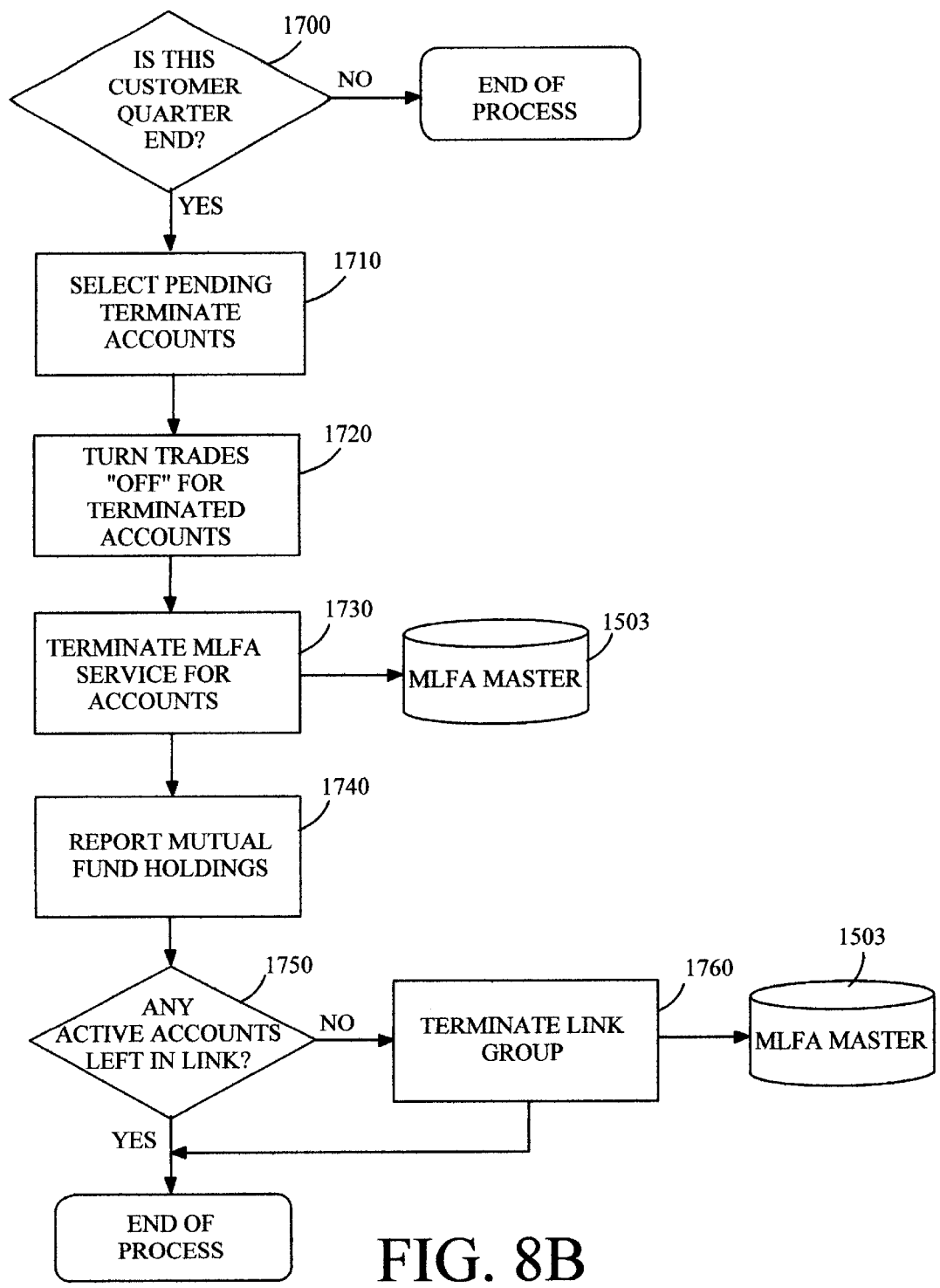

If termination is made at the quarter end, logic is governed by the flowchart of FIG. 8B. Test 1700 first determines the ending quarter, and if so, selects the pending accounts designated for termination, block 1710. This includes deactivating the trading for those accounts, block 1720 and removal of services therefor, block 1730. The Master file is updated accordingly, and the mutual funds reported, block 1740. The system then checks for any active accounts left after termination; if not, the entire link group is terminated, block 1760. Associated records in the Master file are updated accordingly.

Although the invention has been described in detail for the purpose of illustration, it is to be understood that such detail is solely for that purpose and that variations can be made therein by those skilled in the art without departing from the spirit and scope of the invention.

What is claimed is:

1. A method of managing a plurality of Account Groups, the method comprising the steps of:
   (a) defining a plurality of hierarchical tiers based upon an amount of total assets held in an Account Group for the benefit of one or more Account Group holders,
   (b) linking one or more individual accounts to an Account Group,
   (c) determining the amount of total assets held in a first Account Group,
   (d) assigning an initial set of attribute parameters to the first Account Group based upon the amount of total assets held in the Account Group, the attribute parameters specifying at least two of:
      (i) a total number of brokerage trades allowed for the Account Group;
      (ii) a total number of account transactions allowed for the Account Group; and
      (iii) an amount of account service fees to be debited against the Account Group;
   and at least one of:
      (i) one or more financial planning services which the one or more Account Group holders are eligible to receive;
      (ii) one or more account services which the one or more Account Group holders are eligible to receive;
      (iii) one or more financial reports which the one or more Account Group holders are eligible to receive; and
      (iv) a reduction in credit line interest rate applicable to funds borrowed by the one or more Account Group holders; and
   (e) monitoring account transactions and brokerage trades on a periodic and/or repeated basis and, in response thereto, assigning one or more updated attribute parameters to the Account Group.

2. The method of claim 1 further including the steps of, for each of a plurality of Account Groups:
   (a) tracking the amount of total assets held in an Account Group as a function of time, and (b) establishing a fee against the Account Group based thereon.

3. The method of claim 1 further including the steps of, for each of a plurality of Account Groups:
   (a) tracking the amount of total assets held in an Account Group as a function of time, and
   (b) establishing a level of account service access based thereon.

4. The method of claim 1 wherein the first Account Group comprises a first account and a second account, the method further including the steps of:
   (a) tracking an Account Group holder implementing a first account transaction for the first account; the first account transaction having a first transaction cost associated therewith;

(b) tracking an Account Group holder implementing a second account transaction for the second account; the second account transaction having a second transaction cost associated therewith;

(c) debiting a transaction cost against the Account Group based upon the amount of total assets held in the Account Group, wherein the debited transaction cost is less than the sum of the first and second transaction costs.

5. The method of claim 1 wherein the first Account Group comprises a first account and a second account, the method further including the steps of:

(a) tracking an Account Group holder implementing a first account transaction for the first account; the first account transaction having a first transaction financial benefit associated therewith;

(b) tracking an Account Group holder implementing a second account transaction for the second account; the second account transaction having a second transaction financial benefit associated therewith; and (c) providing a financial transaction benefit to the Account Group based upon the amount of total assets held in the Account Group, wherein the provided financial transaction benefit is greater than the sum of the first and second transaction financial benefits.

6. The method of claim 1 further including the step of establishing a communications link to a first financial service if the amount of total assets held in the Account Group is less than a predetermined amount, and establishing a communications link to a second financial service if the amount of total assets held in the Account Group is not less than a predetermined amount.

* * * * *